US012681675B2

(12) United States Patent
Lim et al.

(10) Patent No.: US 12,681,675 B2
(45) Date of Patent: Jul. 14, 2026

(54) IMAGE DISPLAY DEVICE

(71) Applicant: LG ELECTRONICS INC., Seoul (KR)

(72) Inventors: Daewoong Lim, Seoul (KR); Jaeung Han, Seoul (KR); Dongcheon Park, Seoul (KR); Yongbok Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/877,167

(22) PCT Filed: Jun. 20, 2022

(86) PCT No.: PCT/KR2022/008670
§ 371 (c)(1),
(2) Date: Dec. 19, 2024

(87) PCT Pub. No.: WO2023/249131
PCT Pub. Date: Dec. 28, 2023

(65) Prior Publication Data

US 2025/0390266 A1 Dec. 25, 2025

(51) Int. Cl.
*G06F 3/14* (2006.01)
*H04N 21/431* (2011.01)
(Continued)

(52) U.S. Cl.
CPC .......... *G06F 3/1423* (2013.01); *G06F 3/1462* (2013.01); *H04N 21/431* (2013.01);
(Continued)

(58) Field of Classification Search
CPC ............................. G06F 3/1423; G06F 3/1462
(Continued)

(56) References Cited

U.S. PATENT DOCUMENTS 12,417,752 B2 * 9/2025 Ng .......................... G09G 5/14
2013/0328878 A1 12/2013 Stahl et al.
(Continued)

FOREIGN PATENT DOCUMENTS

JP 2015029323 2/2015
JP 2017173763 9/2017
(Continued)

OTHER PUBLICATIONS

PCT International Application No. PCT/KR2022/008670, International Search Report dated Mar. 15, 2023, 2 pages.
(Continued)

*Primary Examiner* — Calvin C Ma
(74) *Attorney, Agent, or Firm* — LEE, HONG, DEGERMAN, KANG & WAIMEY

(57) ABSTRACT

An image display device according to embodiments of the present invention comprises: a display; an external device interface which communicates with an external device; a user input interface which receives a user input; and a controller, wherein the controller can: monitor whether a preset input is received through the user input interface on the basis of a connection with an external display through the external device interface in a state in which a predetermined screen is being output through the display; determine at least one of the screen mode for outputting a plurality of screens or the arrangement of the plurality of screens on the basis of the reception of the preset input in a state in which the predetermined screen is being output; and transmit image signals corresponding to the screen mode and the arrangement of the plurality of screens to the external display through the external device interface.

14 Claims, 20 Drawing Sheets

(51) Int. Cl.
*H04N 21/436* (2011.01)
*H04N 21/485* (2011.01)

(52) U.S. Cl.
CPC ... *H04N 21/4316* (2013.01); *H04N 21/43615* (2013.01); *H04N 21/485* (2013.01); *H04N 21/4858* (2013.01)

(58) Field of Classification Search
USPC .......................................................... 345/1.1
See application file for complete search history.

(56) References Cited

U.S. PATENT DOCUMENTS

| | | | | |
|---|---|---|---|---|
| 2018/0024806 | A1 | 1/2018 | Fujino et al. | |
| 2018/0199101 | A1* | 7/2018 | Kim | H04N 21/437 |
| 2024/0303024 | A1* | 9/2024 | Li | G06F 3/1454 |
| 2024/0370129 | A1* | 11/2024 | Chang | G06F 3/1454 |

FOREIGN PATENT DOCUMENTS

| | | |
|---|---|---|
| JP | 2019110353 | 7/2019 |
| KR | 1020120064490 | 6/2012 |
| KR | 1020150048660 | 5/2015 |

OTHER PUBLICATIONS

European Patent Office Application Serial No. 22948065.2, Search Report dated May 16, 2025, 10 pages.

* cited by examiner

IMAGE DISPLAY DEVICE

CROSS-REFERENCE TO RELATED APPLICATION(S)

This application is the National Stage filing under 35 U.S.C. 371 of International Application No. PCT/KR2022/008670, filed on Jun. 20, 2022, the contents of which are all incorporated by reference herein in its entirety.

TECHNICAL FIELD

The present disclosure relates to an image display device.

BACKGROUND ART

An image display device is a device designed to display an image that can be viewed by a user. Examples of the image display device may include a television (TV), a monitor, a notebook (or laptop) computer, and the like that have a liquid crystal display (LCD) using a liquid crystal or an organic light emitting diode (OLED) display using an OLED.

Such an image display device can transmit and receive data with various electronic devices through a wired or wireless connection. For example, when a notebook computer and a monitor are connected via a communication cable, a user can use both a display provided in the notebook computer and a display included in the monitor, depending on his or her needs. In this case, the same screen may be output through the display of the notebook computer and the display of the monitor, or different screens may be output through the display of the notebook computer and the display of the monitor.

Conventionally, when a user wants to use multiple displays, there is the inconvenience of having to manually configure the settings related to multi-display features provided by the operating system (OS), which involves setting the type of screen output through multiple displays and the arrangement of screens, each time a display for use (i.e., a new display) is added. In addition, if a user is unfamiliar with the settings on multi-display features, utilizing multiple displays may become challenging.

DISCLOSURE

Technical Problem

It is an objective of the present disclosure to solve the above and other problems.

It is another objective of the present disclosure to provide an image display device that can easily update multi-display settings in response to connection with an external display.

It is another objective of the present disclosure to provide an image display device that can provide a user with a user interface related to multi-display in an intuitive manner.

It is yet another objective of the present disclosure to provide an image display device that can easily determine settings for an additionally connected external display according to settings for an existing connected external display.

Technical Solution

In accordance with an aspect of the present disclosure, the above and other objectives can be accomplished by providing an image display device including: a display; an external device interface configured to communicate with an external device; a user input interface configured to receive a user input; and a controller, wherein the controller is configured to: based on connection with an external display through the user input interface while a predetermined screen is output through the display, monitor whether a predetermined input is received through the user input interface; based on receiving the predetermined input while the predetermined screen is displayed, determine at least one of a screen mode for displaying a plurality of screens and arrangement of the plurality of screens; and transmit, through the external device interface, an image signal corresponding to the screen mode and the arrangement of the plurality of screens to the external display.

Advantageous Effects

An image display device according to the present disclosure has the following effects.

According to at least one of the embodiments of the present disclosure, it is possible to easily update multi-display settings in response to connection with an external display.

According to at least one of the embodiments of the present disclosure, it is possible to provide a user with a user interface related to multi-display in an intuitive manner.

According to at least one of the embodiments of the present disclosure, it is possible to easily determine settings for an additionally connected external display according to settings for an existing connected external display.

Further scope of applicability of the present disclosure will become apparent from the following detailed description. However, it should be understood that the detailed description and specific embodiments such as preferred embodiments of the present disclosure are given by way of example only, since various changes and modifications within the idea and scope of the present disclosure may be clearly understood by those skilled in the art.

MODE FOR THE INVENTION

Figure 1A:
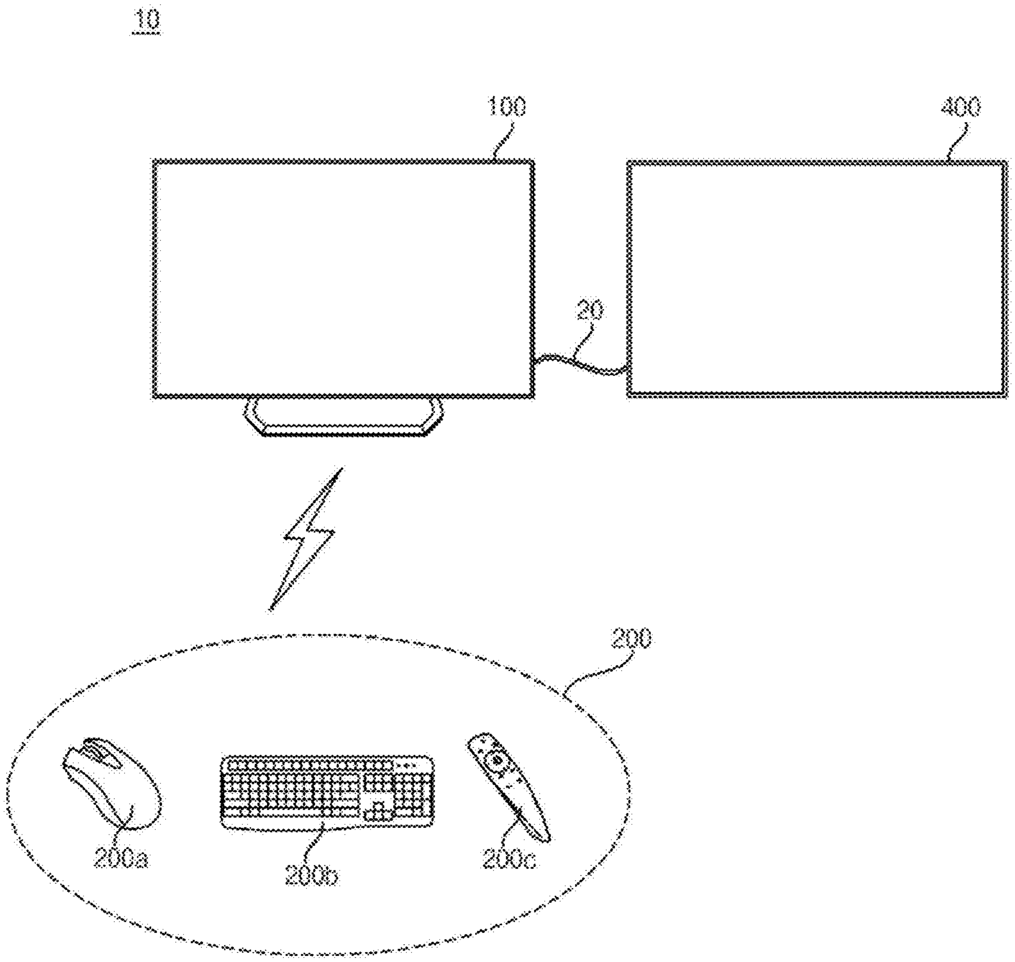
FIGS. 1A and 1B are diagrams illustrating a system according to an embodiment of the present disclosure.

Hereinafter, the present disclosure will be described in detail with reference to the accompanying drawings. In order to clearly and briefly describe the present disclosure, components that are irrelevant to the description will be omitted in the drawings. The same reference numerals are used throughout the drawings to designate the same or similar components.

The suffixes "module" and "unit" used in the following description are given simply in view of the ease of the description, and do not carry any important meaning or role. Therefore, the "module" and the "unit" may be used interchangeably.

It will be understood that the terms "comprises or includes," "has," etc., when used in this specification, specify the presence of stated features, integers, steps, operations, elements, components, or combinations thereof, but do not preclude the presence or addition of one or more other features, integers, steps, operations, elements, components, or combinations thereof.

It will be further understood that although the terms "first," "second," etc. are used herein to describe various components, these components should not be limited by these terms. These terms are only used to distinguish one component from another component.

Figure 1B:
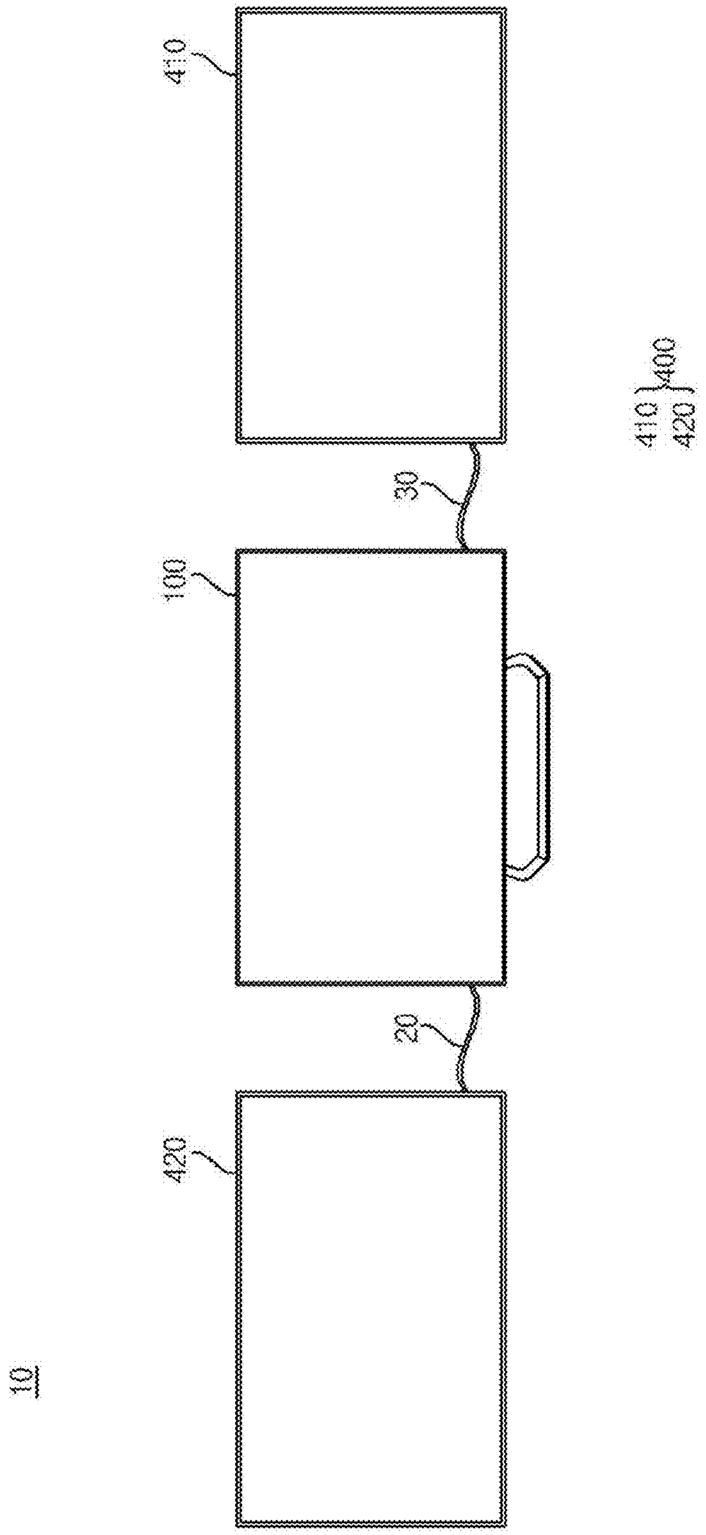

FIGS. 1A and 1B are diagrams illustrating a system according to an embodiment of the present disclosure.

Referring to FIG. 1A, a system 10 may include an image display device 100, a remote control device 200, and/or an external device 400.

The image display device 100 may be a device that processes and outputs an image. The image display device 100 may be a TV, a notebook computer, or a monitor, and is not particularly limited as long as it can output a screen corresponding to an image signal.

The image display device 100 may receive a broadcast signal to process the broadcast signal. A signal-processed image signal may be transmitted to the external display 400.

The image display device 100 may receive a broadcast signal wirelessly via an antenna, or may receive a broadcast signal in a wired manner via a cable. For example, the image display device 100 may receive a terrestrial broadcast signal, a satellite broadcast signal, a cable broadcast signal, an Internet Protocol Television (IPTV) broadcast signal, etc.

The remote control device 200 may be connected, wired and/or wirelessly, to the image display device 100, thereby providing various control signals to the image display device 100. In this case, the remote control device 200 may include a device that establishes a wired or wireless network with the image display device 100 to transmit, through the established network, various control signals to the image display device 100 or receive, through the established network, signals associated with various operations processed by the image display device 100 from the image display device 100.

For instance, various input devices such as a mouse 200*a*, a keyboard 200*b*, a spatial remote controller 200*c*, a trackball, a joystick, and the like may be used as the remote control device 200. The remote control device 200 may be referred to as an external device, and the external device and the remote control device may be used interchangeably in the following description, as necessary.

The image display device 100 may be connected to only a single remote control device 200 or may be simultaneously connected to two or more remote control devices 200, so as to change the object displayed on a screen or adjust the screen status based on a control signal provided from each remote control device 200.

The external display 400 may be a device that processes and outputs an image. The external display 400 may be a TV, a monitor, or the like, and is not particularly limited as long as it can output a screen corresponding to an image signal.

The external display 400 may be communicatively connected to the image display device 100. For example, the external display 400 may be connected in a wired manner to the image display device 100 using a cable 20. The external display 400 may output an image based on an image signal received from the image display device 100. For example, the external display 400 may receive, through the cable 20, a signal including RGB data that corresponds to an image.

Referring to FIG. 1B, the image display device 100 may be connected to each of a plurality of external displays 410 and 420. The image display device 100 may be connected to a first external display 410 via a first cable 20, and may be connected to a second external display 420 via a second cable 30.

The image display device 100 may transmit an image signal to each of the plurality of external displays 410 and 420 through the respective cables 20 and 30. The plurality of external displays 410 and 420 may each output an image corresponding to the image signal received from the image display device 100. For example, the plurality of external displays 410 and 420 may output the same image based on the respective image signals received from the image display device 100. For example, the plurality of external displays 410 and 420 may output different images based on the respective image signals received from the image display device 100.

Figure 2:
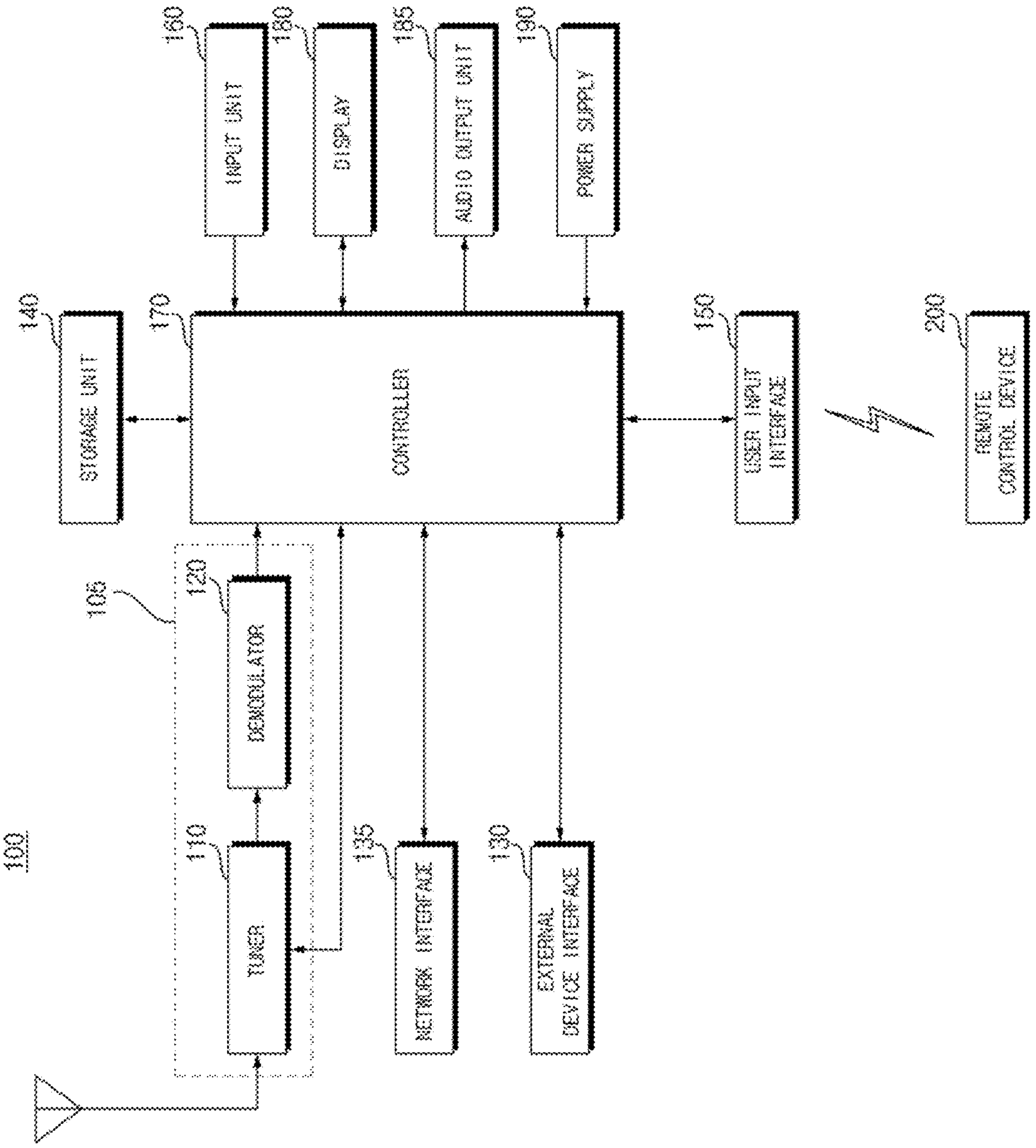
FIG. 2 illustrates an exemplary internal block diagram of an image display device according to an embodiment of the present disclosure.

FIG. 2 is an internal block diagram of an image display device according to an embodiment of the present disclosure.

Referring to FIG. 2, the image display device 100 may include a broadcast receiver 105, an external device interface 130, a network interface 135, a storage unit 140, a user input interface 150, an input unit 160, a controller 170, a display 180, an audio output unit 185, and/or a power supply 190.

The broadcast receiver 105 may include a tuner 110 and a demodulator 120.

Meanwhile, unlike the drawing, the image display device 100 may include only the broadcast receiver 105 and the external device interface 130, among the broadcast receiver 105, the external device interface 130, and the network interface 135. That is, the image display device 100 may not include the network interface 135.

The tuner 110 may select a broadcast signal corresponding to a channel selected by a user or each of all prestored channels from among broadcast signals received through an antenna (not shown) or a cable (not shown). The tuner 110 may convert the selected broadcast signal into an intermediate frequency (IF) signal or a baseband video or audio signal.

For example, when the selected broadcast signal is a digital broadcast signal, the tuner 110 may convert it into a digital IF signal (DIF), and when the selected broadcast signal is an analog broadcast signal, the tuner 110 may convert it into an analog baseband video or audio signal (CVBS/SIF). That is, the tuner 110 may process a digital broadcast signal or an analog broadcast signal. The analog baseband video or audio signal (CVBS/SIF) output from the tuner 110 may be directly input to the controller 170.

The tuner 110 may sequentially select broadcast signals corresponding to all broadcast channels stored through a channel memory function from among the received broadcast signals, and may convert the selected broadcast signals into IF signals or baseband video or audio signals.

The tuner 110 may be implemented as a plurality of tuners so as to receive broadcast signals of a plurality of channels. Alternatively, the tuner 110 may be implemented as a signal tuner capable of simultaneously receiving broadcast signals of a plurality of channels.

The demodulator 120 may receive a digital IF signal (DIF) converted by the tuner 110 to demodulate the digital IF signal (DIF).

The demodulator 120 may perform demodulation and channel decoding and then output a stream signal (TS). Here, the steam signal may be a multiplexed video signal, audio signal or data signal.

The stream signal output from the demodulator 120 may be input to the controller 170. The controller 170 may perform demultiplexing and video/audio signal processing, and then may output an image and sound through the display 180 and the audio output unit 185, respectively.

The external device interface 130 may transmit or receive data to or from an external device connected thereto. To this end, the external device interface 130 may include an A/V input and output unit (not shown).

The external device interface 130 may be connected, wired or wirelessly, to an external device such as a digital versatile disc (DVD) player, a Blu-ray player, a game console, a camera, a camcorder, a computer (e.g., a laptop or notebook), a set-top box, or the like, and may perform input/output operation with the external device.

In addition, the external device interface 130 may establish a communication network with various remote control devices 200 similar to as shown in FIG. 1, so as to receive a control signal associated with the operation of the image display device 100 from the remote control device 200 or transmit data regarding the operation of the image display device 100 to the remote control device 200.

The A/V input and output unit may receive video and audio signals from an external device. For example, the A/V input and output unit may include an Ethernet terminal, a USB terminal, a CVBS (Composite Video Banking Sync) terminal, a component terminal, an S-video terminal (analog), a DVI (Digital Visual Interface) terminal, a HDMI (High-Definition Multimedia Interface) terminal, an MHL (Mobile High-definition Link) terminal, a RGB terminal, a D-SUB terminal, an IEEE 1394 terminal, an SPDIF terminal, a liquid HD terminal, etc. Digital signals input through these terminals may be transmitted to the controller 170. In this case, analog signals input through the CVBS terminal and the S-video terminal may be converted into digital signals by an analog-digital converter (not shown) to be transmitted to the controller 170.

The external device interface 130 may include a wireless communication unit (not shown) for short-range communication with other electronic devices. The wireless communication unit may allow the external device interface 130 to exchange data with a mobile terminal nearby. For example, the external device interface 130 may receive, from the mobile terminal, device information, information about an application that is being executed, an application image, and the like in a mirroring mode.

The external device interface 130 may perform short-range wireless communication using Bluetooth, Radio Frequency Identification (RFID), Infrared Data Association (IrDA), Ultra-Wideband (UWB), ZigBee, etc.

The network interface 135 may provide an interface for connecting the image display device 100 to wired/wireless networks including an Internet network.

The network interface 135 may include a communication module (not shown) to communicate with a wired/wireless network. For example, the network interface 135 may include a communication module for Wireless LAN (WLAN) (Wi-Fi), Wireless Broadband (WiBro), Worldwide Interoperability for Microwave Access (WiMAX), High Speed Downlink Packet Access (HSDPA), etc.

The network interface 135 may transmit or receive data with another user or another electronic device over a connected network or another network linked to the connected network.

The network interface 135 may receive web content or data provided by a content provider or a network operator. That is, the network interface 135 may receive, over a network, content, such as movies, advertisements, games, VODs and broadcasts, and information related to the content provided by a content provider or a network operator.

The network interface 135 may receive update information and update files of firmware provided by a network operator, and may transmit data over the Internet or to a content provider or a network provider.

The network interface 135 may select and receive, through a network, a desired application from among applications open to the public.

The storage unit 140 may store a program for processing and controlling each signal in the controller 170 or may store a signal-processed video (or image), audio or data signal. For example, the storage unit 140 may store application programs designed to perform various tasks that can be processed by the controller 170, and may selectively provide some of the stored application programs upon request by the controller 170.

The program or the like stored in the storage unit 140 is not particularly limited as long as it can be executed by the controller 170.

The storage unit 140 may perform a function of temporarily storing a video, audio, or data signal received from an external device through the external device interface 130.

The storage unit 140 may store information on predetermined broadcast channels through a channel memory function such as channel map or the like.

Although FIG. 2 illustrates an example in which the storage unit 140 is provided separately from the controller 170, the scope of the present disclosure is not limited thereto, and the storage unit 140 may be included in the controller 170.

The storage unit 140 may include at least one of volatile memory (e.g., DRAM, SRAM, SDRAM, etc.) or non-volatile memory (e.g., flash memory, hard disk drive (HDD), solid-state drive (SSD), etc.). In various embodiments of the present disclosure, the storage unit 140 and the memory may be used interchangeably.

The user input interface 150 may deliver a signal input by a user to the controller 170, or may deliver a signal from the controller 170 to the user.

For example, the user input interface 150 may transmit/receive a user input signal such as power on/off, channel selection, or screen setting to/from the remote control device 200, may transmit a user input signal input through a local key (not shown) such as a power key, a channel key, a volume key, or a setting key to the controller 170, may transmit a user input signal input from a sensor unit (not shown) that senses a user's gesture to the controller 170, or may transmit a signal from the controller 170 to the sensor unit.

The input unit 160 may be provided on one side of a body of the image display device 100. For example, the input unit 160 may include a touch pad, a physical button, etc.

The input unit 160 may receive various user commands related to the operation of the image display device 100, and may transmit a control signal corresponding to the received command to the controller 170.

The input unit 160 may include at least one microphone (not shown), and may receive a user's voice through the microphone.

The controller 170 may include at least one processor, and may control the overall operation of the image display device 100 using the processor included therein. Here, the processor may be a general processor such as a central processing unit (CPU). Alternatively, the processor may be a dedicated device such as an application-specific integrated circuit (ASIC), or any of other hardware-based processors.

The controller 170 may demultiplex a stream input through the tuner 110, the demodulator 120, the external device interface 130, or the network interface 135, or may process demultiplexed signals to generate and output a signal for image or audio output.

The display 180 may convert an image (or video) signal, a data signal, an on-screen display (OSD) signal or a control signal processed by the controller 170, or an image signal, a data signal or a control signal received from the external device interface 130 to generate a driving signal.

The display 100 may include a display panel (not shown) including a plurality of pixels.

The plurality of pixels provided in the display panel may include RGB subpixels. Alternatively, the plurality of pixels provided in the display panel may include RGBW subpixels. The display 180 may convert an image signal, a data signal, an OSD signal or a control signal processed by the controller 170 to generate a signal for driving the plurality of pixels.

The display 180 may be a plasma display panel (PDP) display, a liquid crystal display (LCD), an organic light-emitting diode (OLED) display, a flexible display, or the like. Also, the display 180 may be a three-dimensional (3D) display. The 3D display 180 may be classified as a non-glasses type and a glasses type.

Meanwhile, the display 180 may be configured as a touch screen and thus may be used not only as an output device but also as an input device.

The audio output unit 185 may receive an audio signal processed by the controller 170 to output sound.

The image signal processed by the controller 170 may be input to the display 180, such that an image corresponding to the image signal is displayed. In addition, the image signal processed by the controller 170 may be input to an external output device through the external device interface 130.

The audio signal processed by the controller 170 may be output in the form of sound through the audio output unit 185. In addition, the audio signal processed by the controller 170 may be input to an external output device through the external device interface 130.

Although it is not illustrated in FIG. 2, the controller 170 may include a demultiplexer, an image processing unit, and the like. This will be described later with reference to FIG. 3.

The controller 170 may control the overall operation of the image display device 100. For example, the controller 170 may control the tuner 110 to tune a broadcast signal corresponding to a channel selected by a user or a prestored channel.

In addition, the controller 170 may control the image display device 100 in response to a user command input through the user input interface 150 or according to an internal program.

The controller 170 may control the display 180 to display an image. Here, the image displayed on the display 180 may be a still image or a video, and may be a 2D image or a 3D image.

The controller 170 may control such that a predetermined 2D object is displayed in the image displayed on the display 180. For example, the object may be at least one of a connected web screen (e.g., newspaper or magazine), an electronic program guide (EPG), various menus, a widget, an icon, a still image, a video, and a text.

Meanwhile, the image display device 100 may further include a photographing unit (not shown). The photographing unit may photograph a user. The photographing unit may be configured as a single camera, but is not limited thereto, and may be configured as a plurality of cameras. The photographing unit may be embedded in the image display device 100, namely, at an upper portion of the display 180 or may be provided separately. Information of an image captured by the photographing unit may be input to the controller 170.

The controller 170 may recognize the location of a user based on an image captured by the photographing unit. For example, the controller 170 may identify a distance (z-axis coordinate) between the user and the image display device 100. In addition, the controller 170 may determine the x-axis coordinate and the y-axis coordinate in the display 180 that corresponds to the location of the user.

The controller 170 may detect a user's gesture based on an image captured by the photographing unit, or each of signals sensed by the sensor unit or a combination thereof.

The power supply 190 may supply corresponding power throughout the image display device 100. In particular, the power supply 190 may supply power to the controller 170, which can be implemented as a system-on-chip (SOC), the display 180 for displaying an image, and the audio output unit 185 for audio output.

Specifically, the power supply 190 may include a converter (not shown) for converting alternating current (AC) power to direct current (DC) power, and a DC/DC converter (not shown) for converting the level of DC power.

The remote control device 200 may transmit a user input to the user input interface 150. To this end, the remote control device 200 may use Bluetooth, Radio Frequency (RF) communication, Infrared Radiation (IR) communication, Ultra-Wideband (UWB), ZigBee, etc. In addition, the remote control device 200 may receive a video, audio, or data signal output from the user input interface 150 to output the received signal in the form of an image or sound.

The image display device 100 described above may be a digital broadcast receiver capable of receiving a fixed or mobile digital broadcast.

Meanwhile, the block diagram of the display device 100 shown in FIG. 2 is merely one embodiment of the present disclosure, and the respective components of the display device 100 may be combined, added, or omitted according to the specification of the image display device 100 that is actually implemented.

In other words, as necessary, two or more components may be combined into one component, or one component may be subdivided into two or more components. In addition, the function performed in each block is merely illustrative, and a specific operation or configuration thereof does not limit the scope of the present disclosure.

Figure 3:
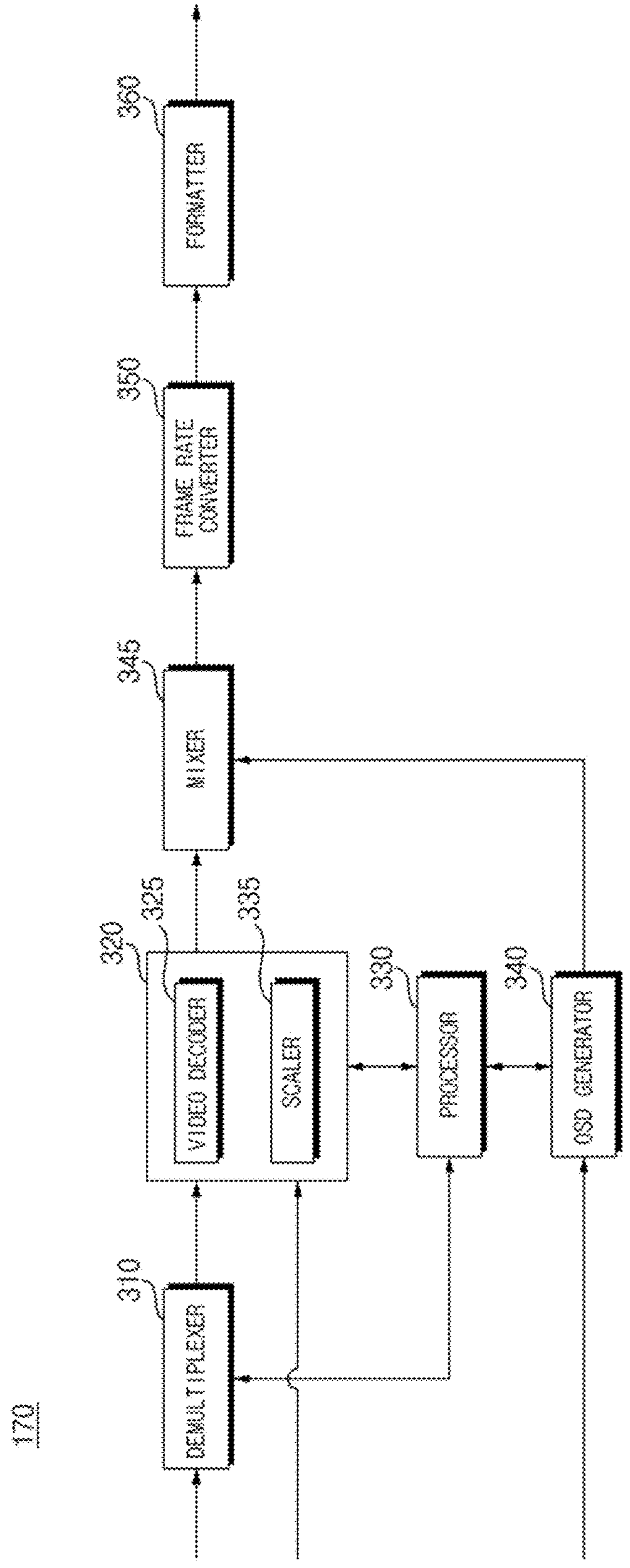
FIG. 3 is a diagram for explaining a controller of FIG. 2.

FIG. 3 is an internal block diagram of a controller of FIG. 2.

Referring to FIG. 3, the controller 170 according to an embodiment of the present disclosure may include a demultiplexer 310, an image processing unit 320, a processor 330, an OSD generator 340, a mixer 345, a frame rate converter 350, and/or a formatter 360. The controller 170 may further include an audio processing unit (not shown) and a data processing unit (not shown).

The demultiplexer 310 may demultiplex an input stream. For example, the demultiplexer 310 may demultiplex an MPEG-2 TS into an image (or video) signal, an audio signal, and a data signal. Here, the stream signal input to the demultiplexer 310 may be a stream signal output from the tuner 110, the demodulator 120, or the external device interface 130.

The image processing unit 320 may process the demultiplexed image signal. To this end, the image processing unit 320 may include a video decoder 325 and a scaler 335.

The video decoder 325 may decode the demultiplexed image signal, and the scaler 335 may perform scaling to allow the resolution of the decoded image signal to be displayed on the display 180.

The video decoder 325 may include decoders of various standards. For example, the video decoder 325 may include an MPEG-2 decoder, an H.264 decoder, a 3D video decoder for a color image and a depth image, a decoder for multi-view images, etc.

The processor 330 may control the overall operation of the image display device 100 or the controller 170. For example, the processor 330 may control the tuner 110 to tune a broadcast corresponding to a channel selected by a user or a prestored channel.

Additionally, the processor 330 may control the image display device 100 in response to a user command input through the user input inface 150 or according to an internal program.

Additionally, the processor 330 may control data transmission with the network interface 135 or the external device interface 130.

Additionally, the processor 330 may control the operation of the demultiplexer 310, the image processing unit 320, the OSD generator 340, and the like in the controller 170.

The OSD generator 340 may generate an OSD signal autonomously or according to a user input. For example, based on a user input signal input through the input unit 160, the OSD generator 340 may generate a signal for displaying various kinds of information as a graphic or text on the screen of the display 180.

The generated OSD signal may include various data such as a user interface screen of the image display device 100, various menu screens, widgets, icons, and the like. In addition, the generated OSD signal may include a 2D object or a 3D object.

The OSD generator 340 may generate a pointer that can be displayed on the display 180 based on a pointing signal input from the remote control device 200.

The OSD generator 340 may include a pointing signal processor (not shown) to generate a pointer. The pointing signal processor (not shown) may be provided separately, instead of being provided in the OSD generator 340.

The mixer 345 may mix the OSD signal generated by the OSD generator 340 and the decoded image signal processed by the image processing unit 320. The mixed image signal may be provided to the frame rate converter 350.

The frame rate converter (FRC) 350 may convert the frame rate of an input image. Alternatively, the frame rate converter 350 may output an input image without any frame rate conversion.

The formatter 360 may arrange a left-eye image frame and a right-eye image frame of the frame rate converted 3D image. The formatter 360 may output a synchronization signal Vsync to open the left eye glass and the right eye glass of a 3D viewing device (not shown).

Meanwhile, the formatter 360 may change the format of an input image signal to an image signal to be suitable for being displayed on the display 180.

In addition, the formatter 360 may change the format of a 3D image signal. For example, the formatter 360 may change the format of a 3D image signal to one of various 3D formats such as a side-by-side format, a top/down format, a frame sequential format, an interlaced format, and a checker box format.

Meanwhile, the formatter 360 may convert a 2D image signal into a 3D image signal. For example, according to a 3D image generation algorithm, the formatter 360 may detect an edge or a selectable object in a 2D image signal, and separate and generate an object according to the detected edge or the selectable object as a 3D image signal. Here, the generated 3D image signal may be separated into a left-eye image signal L and a right-eye image signal R to be aligned.

Although not shown in the drawing, a 3D processor (not shown) for 3-dimensional (3D) effect signal processing may be further provided after the formatter 360. Such a 3D processor may perform brightness, tint, and color adjustment to improve the 3D effect. For example, the 3D processor may perform signal processing to make the near clear and the far blurry. Meanwhile, the function of the 3D processor may be integrated into the formatter 360 or the image processing unit 320.

Meanwhile, the audio processing unit (not shown) in the controller 170 may process a demultiplexed audio signal. To this end, the audio processing unit (not shown) may include various decoders.

The audio processing unit (not shown) in the controller 170 may perform bass, treble, and volume adjustment.

The data processing unit (not shown) in the controller 170 may perform data processing on a demultiplexed data signal. For example, when the demultiplexed data signal is an encoded data signal, the data processing unit may decode it. The encoded data signal may be electronic program guide (EPG) information including broadcasting information such as the start time and end time of broadcast programs aired on each channel.

Meanwhile, the block diagram of the controller 170 shown in FIG. 3 is merely one example of the present disclosure. The respective components of the block diagram may be combined, added, or omitted depending on the specification of the controller 170 that is actually implemented.

In particular, the frame rate converter 350 and the formatter 360 may not be provided in the controller 170. Instead, the frame rate converter 350 and the formatter 360 may be provided individually or provided as a single module, separately from the controller 170.

Meanwhile, according to an embodiment of the present disclosure, the external display 400 may include at least some of the components included in the image display device 100. For example, the external display 400 may include an external device interface, a storage unit, a controller, a display, and/or a power supply.

The external display 400 may communicate with the image display device 100 through the external device interface. For example, the external display 400 may be connected in a wired manner to the image display device 100 via a cable connected to the external device interface.

The external display 400 may receive power through the external device interface. For example, the external display

400 may be supplied with power via the cable connected to the external device interface. The power supplied to the external display 400 through the external device interface may be transmitted to the power supply of the external display 400. The power supply of the external display 400 may supply power to each of the components provided in the external display 400.

The external display 400 may output, through the display, an image corresponding to an image signal received from the image display device 100.

Figure 4:
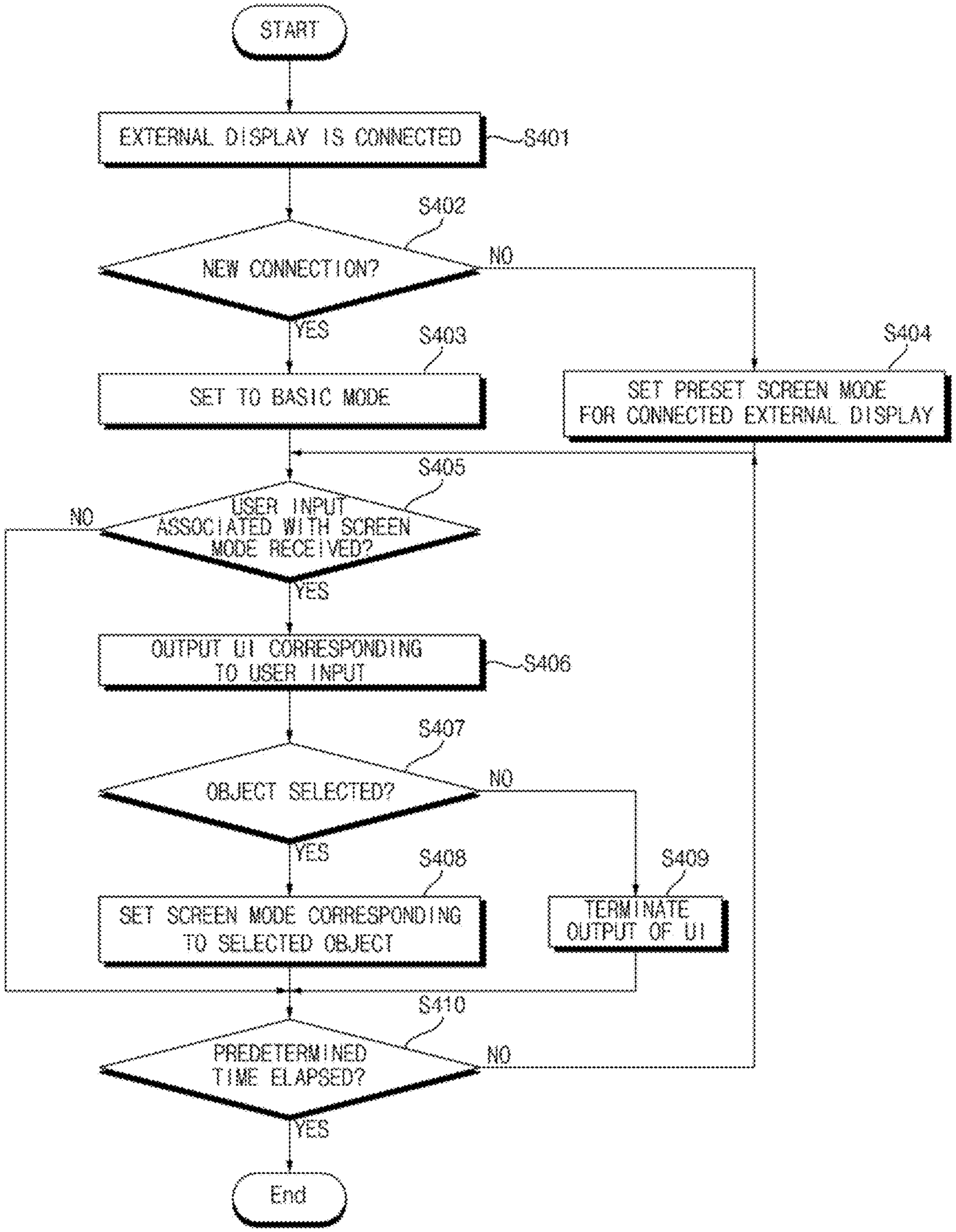
FIG. 4 is a flowchart illustrating a method of operating an image display device according to an embodiment of the present disclosure.

FIG. 4 is a flowchart illustrating a method of operating an image display device according to an embodiment of the present disclosure.

Referring to FIG. 4, in operation S401, the image display device 100 may be connected with an external display 400. For example, the image display device 100 may communicate with the external display 400 via a cable connected to the external device interface 130.

In operation S402, the image display device 100 may determine whether the connection with the external display 400 is a new connection. For example, the image display device 100 may store, in the storage unit 140, a connection history of an external device connected through the external device interface 130. Here, the connection history of the external device may include an identifier corresponding to the external device, settings set in response to the external device, and the date and time when the external device is connected. When a connection history corresponding to the external display 400 is stored in the storage unit 140, the image display device 100 may determine that the external display 400 is a previously connected external device. By contrast, when a connection history corresponding to the external display 400 is not stored in the storage unit 140, the image display device 100 may determine that the external display 400 is a newly connected external device.

In operation S403, based on the external display 400 being a newly connected external device, the image display device 100 may set a screen mode for displaying a plurality of screens to a basic mode. Here, the screen mode may include a basic mode to output the same screen through a plurality of displays and an extended mode to output different screens through a plurality of displays. For example, when the screen mode is set to the basic mode, a specific screen may be output identically through a plurality of displays. For example, when the screen mode is set to the extended mode, a first area of the specific screen may be output through a first display, and a second area of the specific screen may be output through a second display.

Figure 5A:
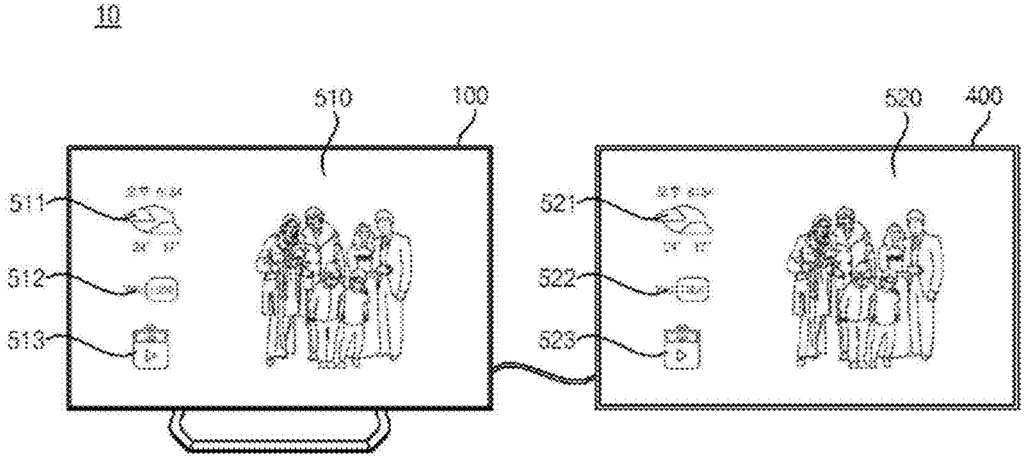
FIGS. 5A to 13 are diagrams for explaining the operation of the image display device.

Referring to FIG. 5A, when the screen mode is set to the basic mode, the same screen may be displayed on the image display device 100 and the external display 400. For example, the image display device 100 may output a main screen 510 including an indicator 511 for providing information such as current time, weather, temperature, and the like, and objects 512 and 513 corresponding to applications. In this case, the image display device 100 may transmit an image signal corresponding to the main screen 510 to the external display 400. Based on the image signal corresponding to the main screen 510 received from the image display device 100, the external display 400 may output a screen 520 (hereinafter referred to as a "duplicate screen") that is identical to the main screen 510. The duplicate screen 520 may include an indicator 521 corresponding to the indicator 511 included in the main screen 510, and objects 522 and 523 corresponding to the objects 512 and 513 included in the main screen 510.

Meanwhile, based on a signal received from the remote control device 200, a pointer 205 corresponding to the remote control device 200 may be displayed identically on a plurality of screens 510 and 520. When a user moves the remote control device 200 up or down and left or right, a position where the pointer 205 is displayed may be changed in response to the movement of the remote control device 200. For example, information regarding the movement of the remote control device 200 may be transmitted to the image display device 100. In this case, the image display device 100 may calculate coordinates of the pointer 205 based on the information regarding the movement of the remote control device 200. In addition, the image display device 100 may display the pointer 205 to correspond to the calculated coordinates. Meanwhile, the moving speed or direction of the pointer 205 may correspond to the moving speed or direction of the remote control device 200.

Figure 5B:
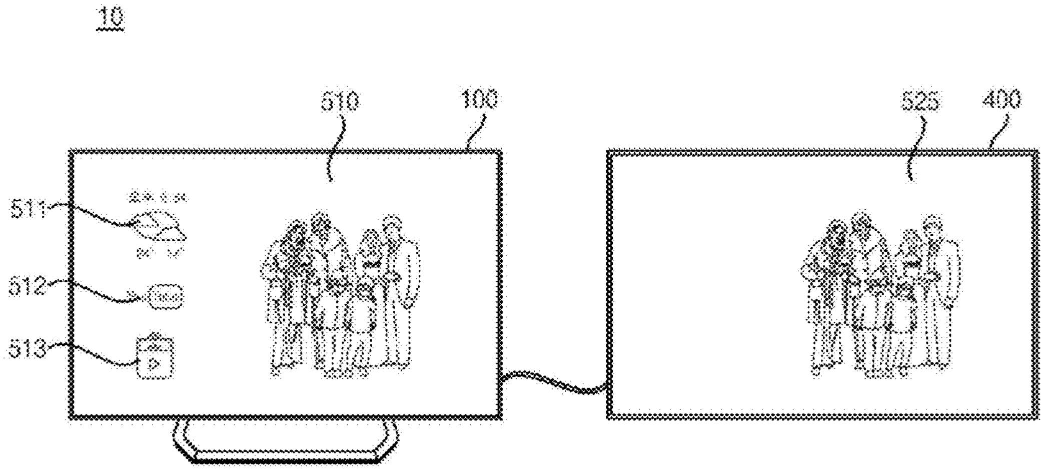

Meanwhile, referring to FIG. 5B, when the screen mode is set to the extended mode, different screens may be displayed on the image display device 100 and the external display 400. For example, while outputting the main screen 510, the image display device 100 may transmit an image signal corresponding to a screen different from the main screen 510 to the external display 400. Based on the image signal received from the image display device 100, the external display 400 may output a screen 525 (hereinafter referred to as an "extended screen") that is different from the main screen 510. The extended screen 525 may include only a background image included in the main screen 510.

Meanwhile, based on a signal received from the remote control device 200, the pointer 205 corresponding to the remote control device 200 may be displayed on one of the plurality of screens 510 and 525. In this case, based on a user input for changing a position of the pointer 205 corresponding to the remote control device 200, the pointer displayed on the main screen 510 of the image display device 100 may be displayed on the extended screen 525 of the external display 400.

Figure 6:
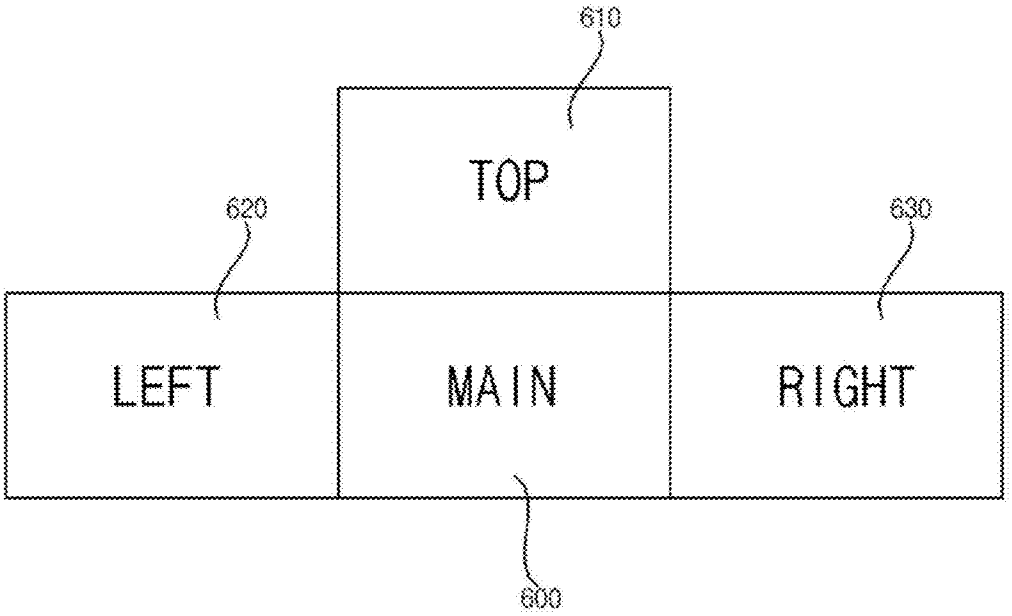

Referring to FIG. 6, when the screen mode is set to the extended mode, the arrangement of a plurality of screens (i.e., a layout for multiple screens) output through a plurality of displays may be set. The plurality of screens may consist of a main screen and at least one sub screen. For example, when one external display 400 is connected to the image display device 100, the screen output through the image display device 100 may be set as a main screen 600. In this case, the screen output through the external display 400 may be set as a sub screen. With respect to the main screen 600, the sub screen may be placed to one of a top 610, a left 620, and a right 630 of the main screen 600.

In operation S404, when the external display 400 is not a newly connected external device, the image display device 100 may set a preset mode for the external display 400 as the screen mode. For example, when the screen mode included in the connection history corresponding to the external display 400 is the extended mode, the image display device 100 may set the screen mode to the extended mode. Here, when the screen placement included in the connection history corresponding to the external display 400 is in the right (rightward) direction, the image display device 100 may determine the arrangement of the plurality of screens so that the screen output through external the display 400 is positioned to the right of the screen output through the display 180.

In operation S405, the image display device 100 may monitor whether a user input associated with the screen mode is received.

In one embodiment, the image display device 100 may determine whether a user input associated with the screen mode is received, based on the coordinates of the pointer 205 corresponding to the remote control device 200. For example, when the pointer 205 displayed on the screen output through the display 180 is located in a predetermined area for a predetermined minimum time or more, the image display device 100 may determine that a user input associated with the screen mode is received. For example, when the pointer 205 displayed on the screen output through the display 180 moves in a predetermined direction in a predetermined area, the image display device 100 may determine that a user input associated with the screen mode is received. For example, when an input of pressing a specific button on the remote control device 200 a predetermined number of times is received while the pointer 205 displayed on the screen output through the display 180 is located in a predetermined area, the image display device 100 may determine that a user input associated with the screen mode is received.

In one embodiment, the image display device 100 may determine whether a user input associated with the screen mode is received, based on receiving an input of pressing a button corresponding to the direction provided on the remote control device 200. For example, in response to receiving an input of pressing one of a plurality of buttons corresponding to a plurality of directions provided on the remote control device 200 a predetermined number of times in a row (or consecutively), the image display device 100 may determine that a user input associated with the screen mode is received.

In operation S406, based on receiving the user input associated with the screen mode, the image display device 100 may output a user interface (UI) corresponding to the received user input on the screen output through the display 180. Here, the user interface (UI) may include at least one object related to the screen mode. For example, the object related to the screen mode may include an object for arranging a plurality of screens, an object for changing a screen mode, an object for executing a function related to multi-display settings, etc.

In operation S407 and operation S408, based on selection of an object included in the user interface (UI) through the user input interface 150, the image display device 100 may set the screen mode corresponding to the selected object.

By contrast, in operation S409, the image display device 100 may terminate the output of the user interface (UI) when an input for selecting an object included in the user interface (UI) through the user input interface 150 is not received. For example, the image display device 100 may terminate the output of the user interface (UI) when 3 seconds have elapsed from the moment the user interface (UI) is output through the display 180.

Figure 7A:
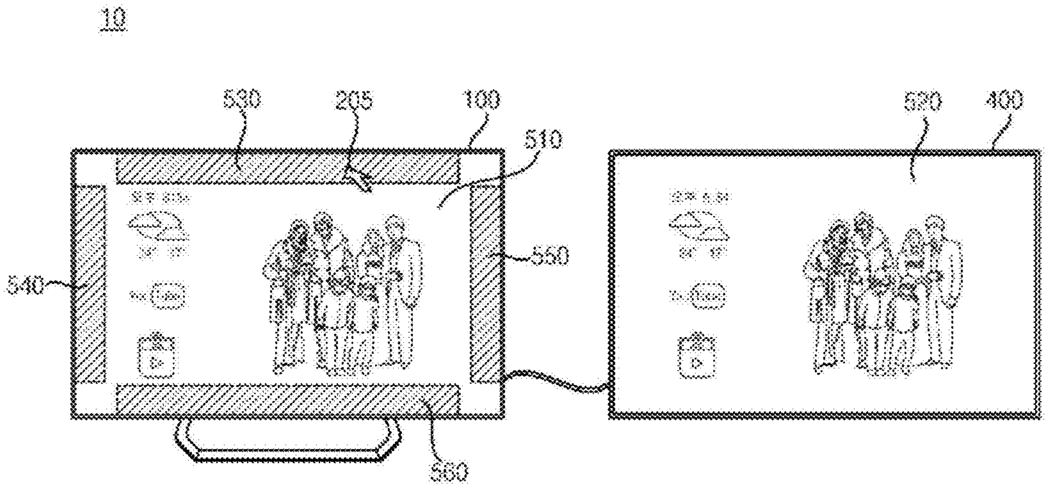
Figure 7B:
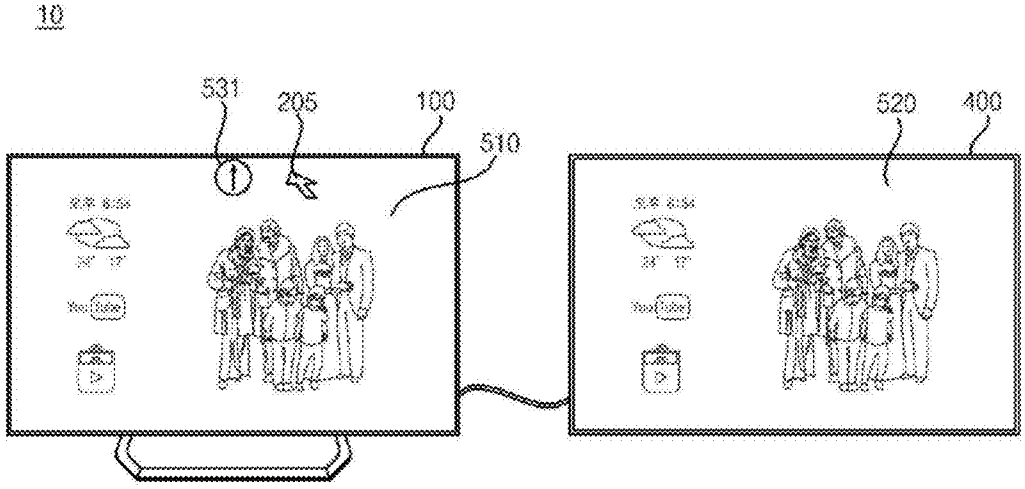

Referring to FIGS. 7A and 7B, when the pointer 205 displayed on the main screen 510 output through the image display device 100 is located in a predetermined top area 530 for 2 seconds or more, which is a predetermined minimum time, a first object 531 corresponding to the top area 530 may be displayed on the main screen 510. The first object 531 may be an object indicating the up (upward) direction.

Based on receiving an input for selecting the first object 531 through the external device interface 150 while the current screen mode is preset to the basic mode, the image display device 100 may set (or change) the screen mode to the extended mode. In addition, the image display device 100 may determine the arrangement of the plurality of screens so that the extended screen 525 output through the external display 400 is positioned to the top of (i.e., positioned above) the main screen 510.

Figure 8A:
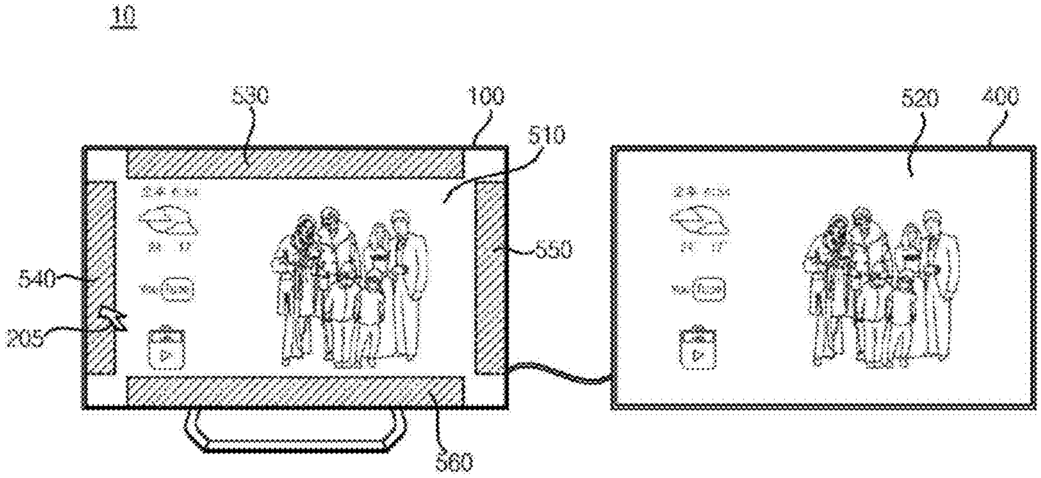
Figure 8B:
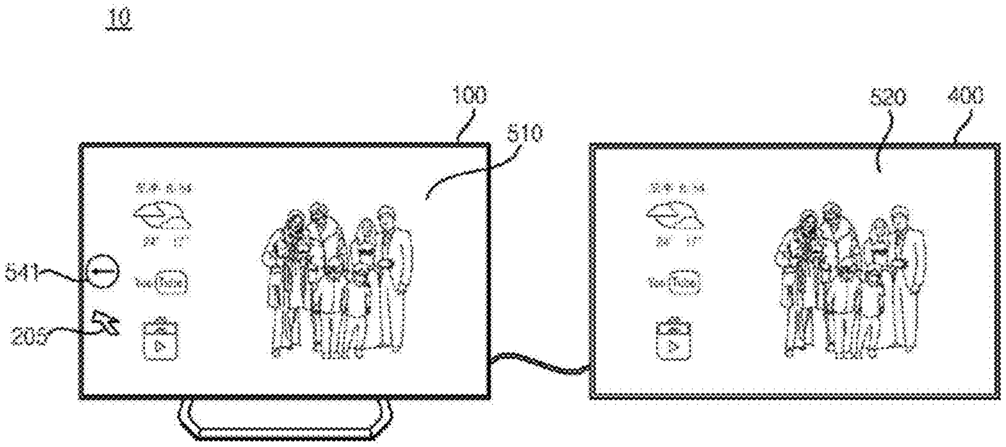

Referring to FIGS. 8A and 8B, when the pointer 205 displayed on the main screen 510 output through the image display device 100 is located in a predetermined left area 540 for 2 seconds or more, which is a predetermined minimum time, a second object 541 corresponding to the left area 540 may be displayed on the main screen 510. The second object 541 may be an object indicating the left direction.

Based on receiving an input for selecting the second object 541 through the external device interface 150 while the current screen mode is preset to the basic mode, the image display device 100 may set (or change) the screen mode to the extended mode. In addition, the image display device 100 may determine the arrangement of the plurality of screens so that the extended screen 525 output through the external display 400 is positioned to the left of the main screen 510.

Figure 9A:
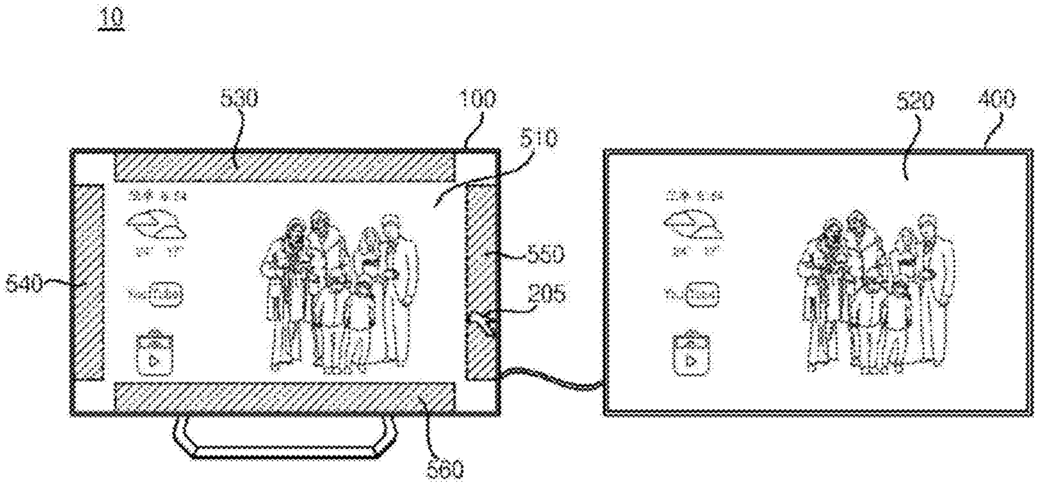
Figure 9B:
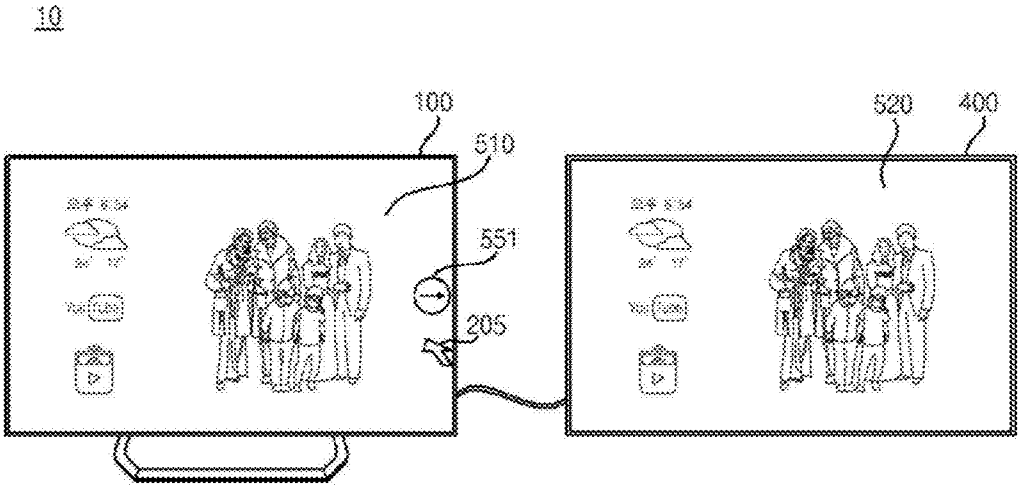

Referring to FIGS. 9A and 9B, when the pointer 205 displayed on the main screen 510 output through the image display device 100 is located in a predetermined right area 550 for 2 seconds or more, which is a predetermined minimum time, a third object 551 corresponding to the right area 550 may be displayed on the main screen 510. The third object 551 may be an object indicating the right direction.

Based on receiving an input for selecting the third object 551 through the external device interface 150 while the current screen mode is preset to the basic mode, the image display device 100 may set (or change) the screen mode to the extended mode. In addition, the image display device 100 may determine the arrangement of the plurality of screens so that the extended screen 525 output through the external display 400 is positioned to the right of the main screen 510.

Figure 10A:
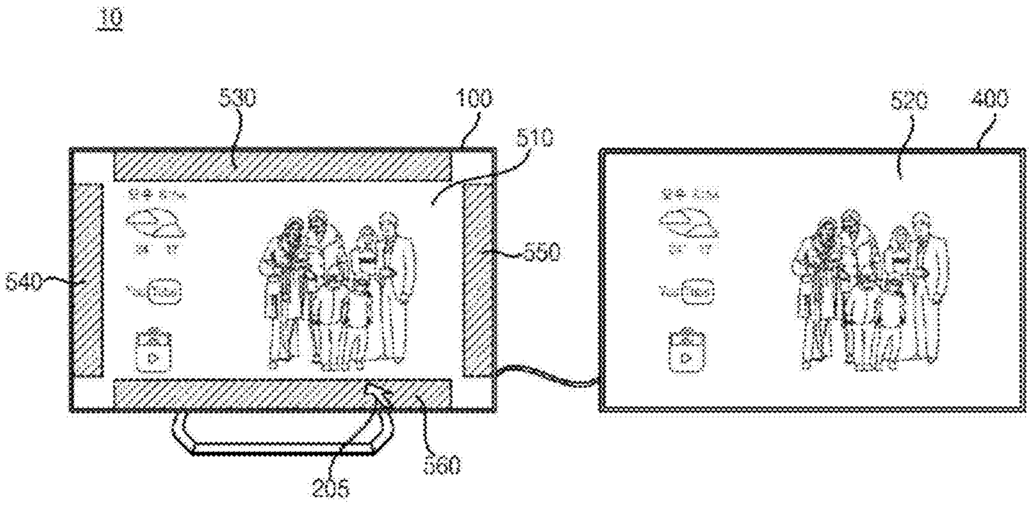
Figure 10B:
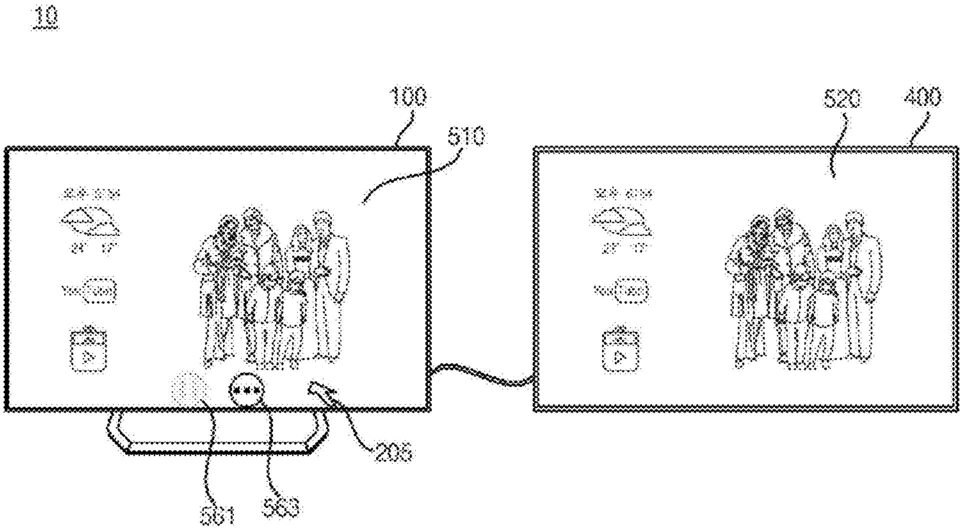
Figure 10C:
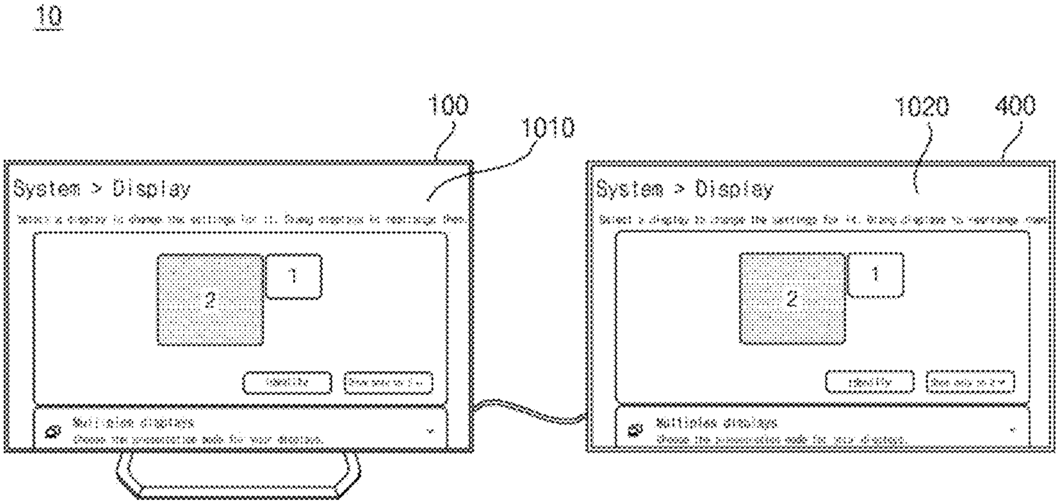

Referring to FIGS. 10A to 10C, when the pointer 205 displayed on the main screen 510 output through the image display device 100 is located in a predetermined bottom area 560 for 2 seconds or more, which is a predetermined minimum time, a fourth object 561 and a fifth object 563 corresponding to the bottom area 560 may be displayed on the main screen 510. The fourth object 561 may be an object for setting the screen mode to the basic mode. The fifth object 563 may be an object for executing a function related to multi-display settings.

Based on the current screen mode being preset to the basic mode, the fourth object 561 may be output as a non-selectable object. Here, a selectable object may be displayed in a darker color than the non-selectable object. In this case, even when a user selects a non-selectable object through the remote control device 200, the image display device 100 may ignore an input for selecting the object received from the remote control device 200.

Meanwhile, based on receiving an input for selecting the fifth object 563 through the external device interface 150, the image display device 100 may execute a function related to multi-display settings. In response to the execution of the function related to multi-display settings, the image display device 100 may output a multi-display setting screen 1010 through the display 180. In this case, a user may select a screen mode, arrangement of multiple screens, and the like through the multi-display setting screen 1010.

Meanwhile, in response to the current screen mode being preset to the basic mode, the external display 400 may also output a multi-display setting screen 1020 in the same manner.

Figure 11A:
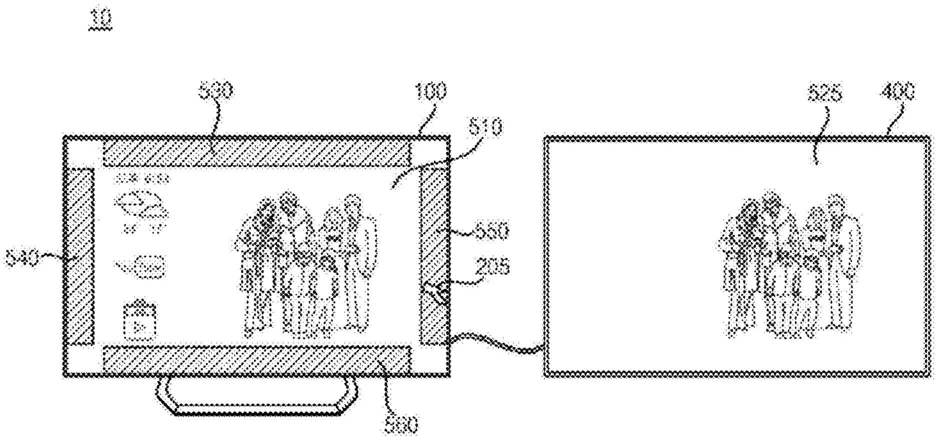
Figure 11B:
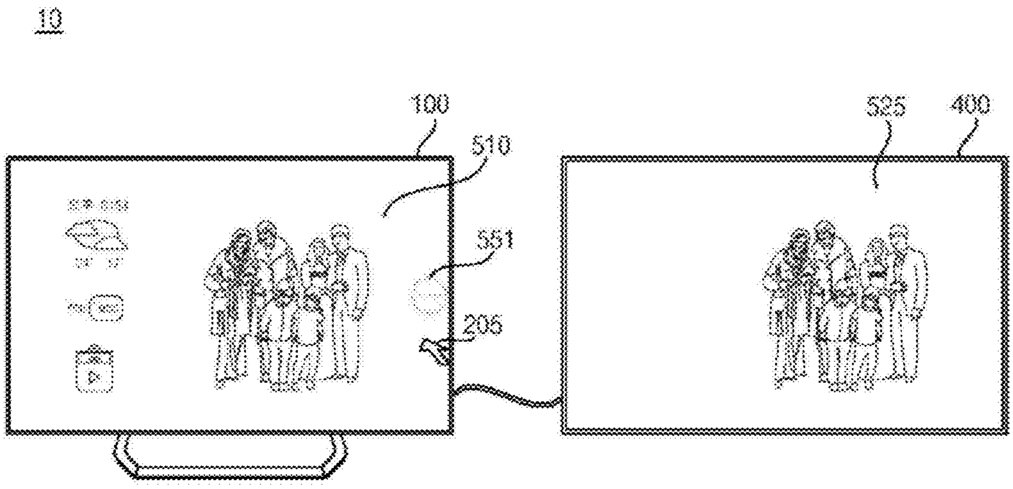

Meanwhile, referring to FIGS. 11A and 11B, when the pointer 205 displayed on the main screen 510 output through the image display device 100 is located in a predetermined right area 550 for 2 seconds or more, which is a predetermined minimum time, a third object 551 corresponding to the right area 550 may be displayed on the main screen 510.

In this case, based on the current screen mode being preset to the extended mode and the extended screen 525 being preset to be positioned to the right of the main screen 510, the third object 551 may be output as a non-selectable object.

Figure 12A:
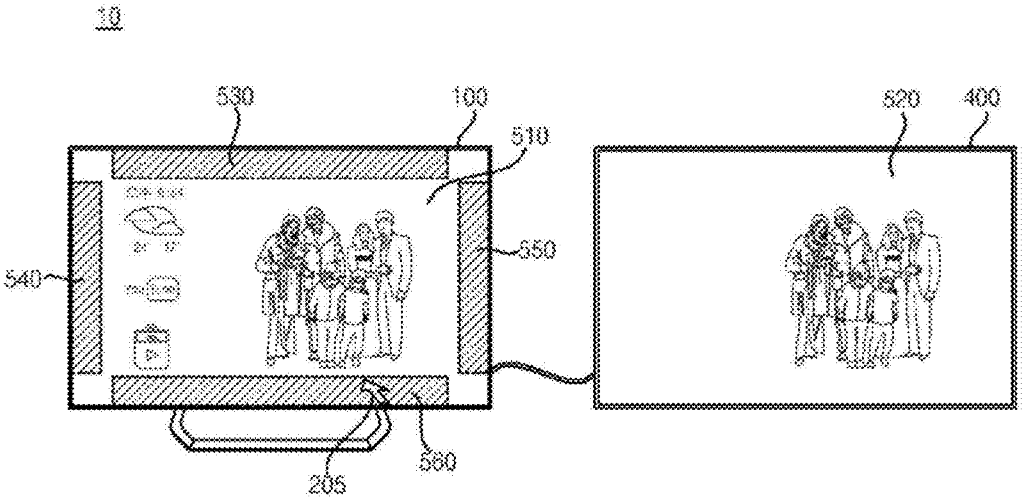
Figure 12B:
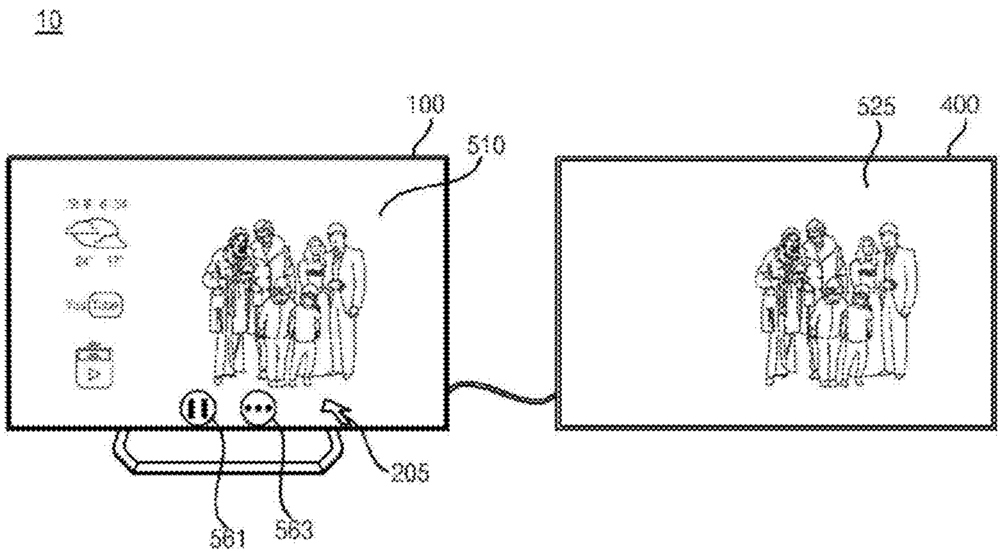
Figure 12C:
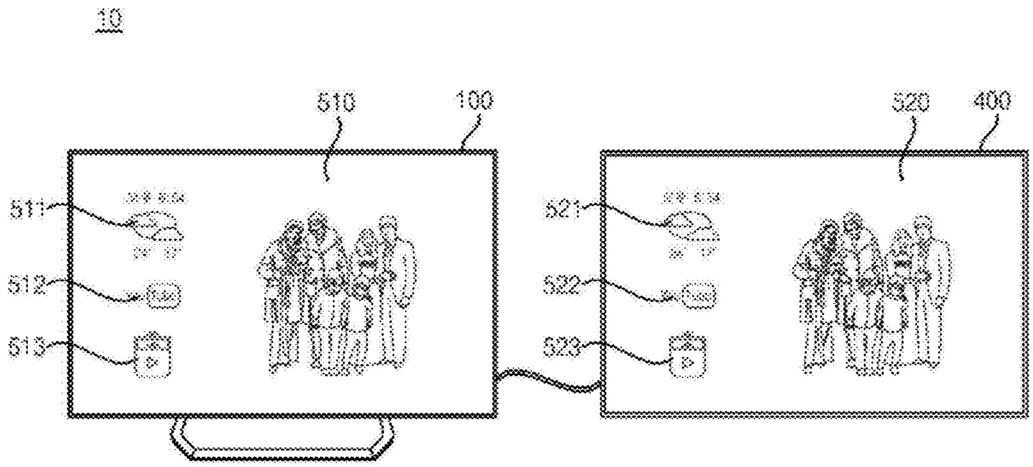

Meanwhile, referring to FIGS. 12A to 12C, when the pointer 205 displayed on the main screen 510 output through the image display device 100 is located in a predetermined bottom area 560 for 2 seconds or more, which is a predetermined minimum time, a fourth object 561 and a fifth object 563 corresponding to the bottom area 560 may be displayed on the main screen 510.

In this case, unlike FIG. 10B, the fourth object 561 may be output as a selectable object based on the current screen mode being preset to the extended mode. Based on receiving an input for selecting the fourth object 561 through the external device interface 150 while the current screen mode is preset to the extended mode, the image display device 100 may set (or change) the screen mode to the basic mode. In addition, based on the screen mode being set to the basic mode, the image display device 100 may transmit an image signal corresponding to the main screen 510 to the external display 400. Based on the image signal corresponding to the main screen 510 received from the image display device 100, the external display 400 may output a duplicate screen 520 that is identical to the main screen 510.

In operation S410, the image display device 100 may determine whether a predetermined time has elapsed after the external display 400 is connected. The image display device 100 may determine whether to output a user interface (UI) based on a user input associated with the screen mode until the predetermined time elapses after the external display 400 is connected.

Figure 13:
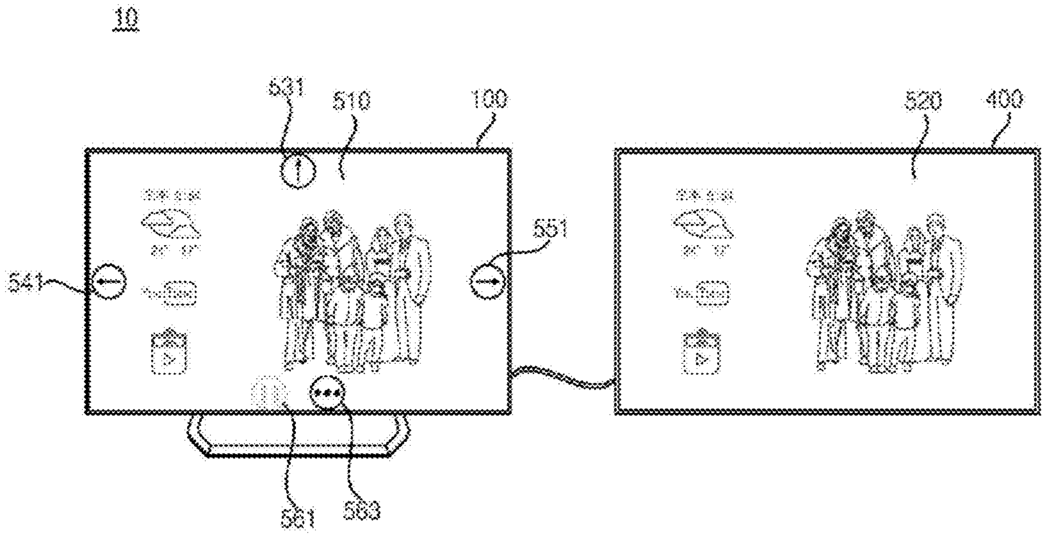

Meanwhile, referring to FIG. 13, the image display device 100 may output all of a first object 531 to a fifth object 563 on the main screen 510. For example, when the pointer 205 displayed on the main screen 510 is located in one of a predetermined plurality of areas for 2 seconds or more, which is a predetermined minimum time, the image display device 100 may output all of the first object 531 to the fifth object 563 on the main screen 510. For example, when the external display 400 is newly connected to the image display device 100 through the external device interface 130, the image display device 100 may output all of the first object 531 to the fifth object 563 on the main screen 510. In this case, based on the current screen mode being preset to the basic mode, the fourth object 561 may be output as a non-selectable object.

Meanwhile, based on receiving an input of pressing a button corresponding to the direction provided on the remote control device 200, the image display device 100 may set at least one of the screen mode and the arrangement of the plurality of screens.

For example, based on receiving three consecutive inputs of pressing a button corresponding to the left direction from the remote control device 200, the image display device 100 may output the second object 541 on the main screen 510. In this case, based on receiving an input of pressing a button for selecting the second object 541 through the external device interface 150, the image display device 100 may determine the arrangement of the plurality of screens so that the extended screen 525 output through the external display 400 is positioned to the left of the main screen 510.

For example, based on receiving three consecutive inputs of pressing a button corresponding to the left direction from the remote control device 200, the image display device 100 may set the screen mode to the extended mode. In addition, the image display device 100 may determine the arrangement of the plurality of screens so that the extended screen 525 output through the external display 400 is positioned to the left of the main screen 510.

Figure 14A:
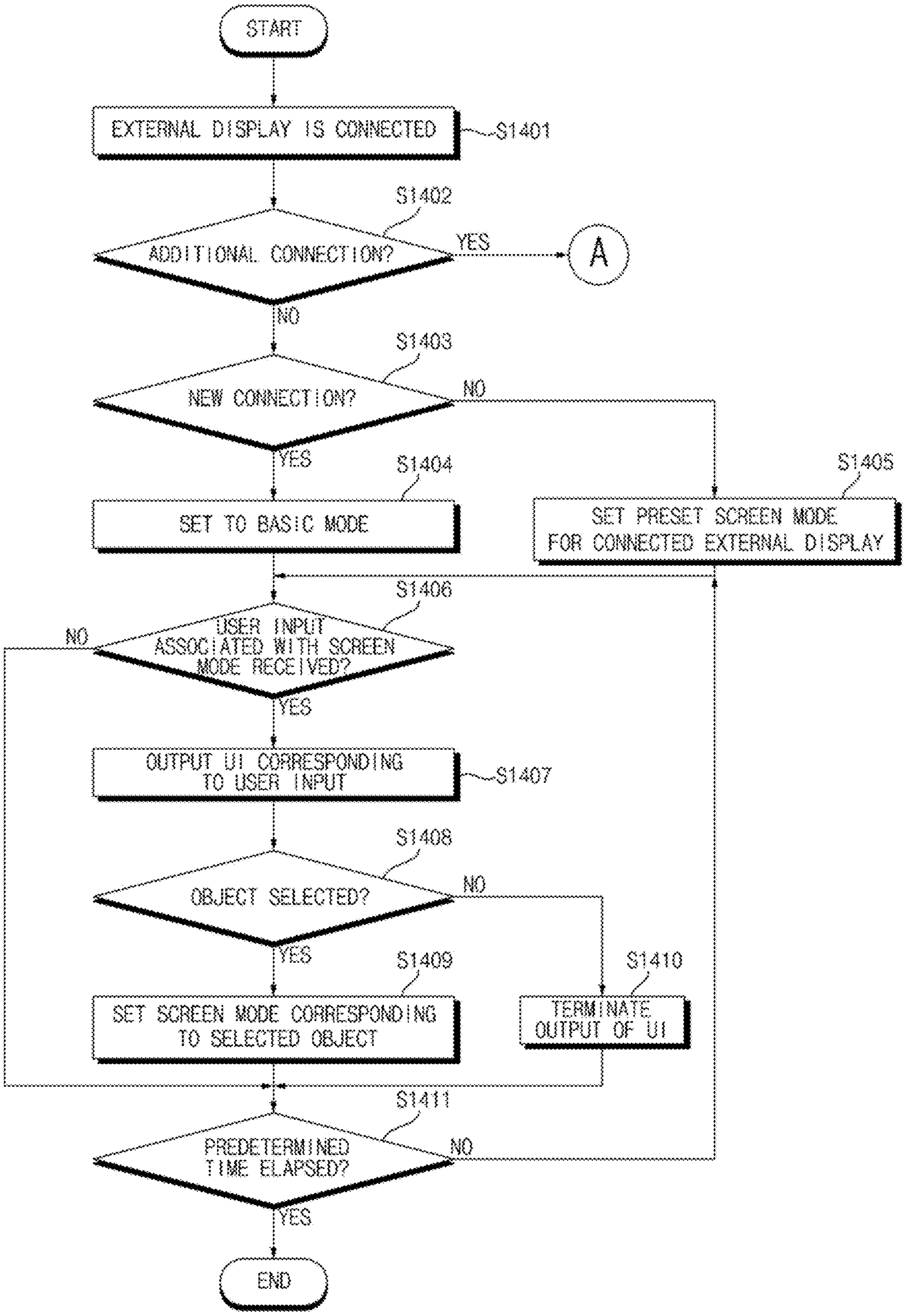
FIGS. 14A and 14*b* are flowcharts illustrating a method of operating an image display device according to an embodiment of the present disclosure.
Figure 14B:
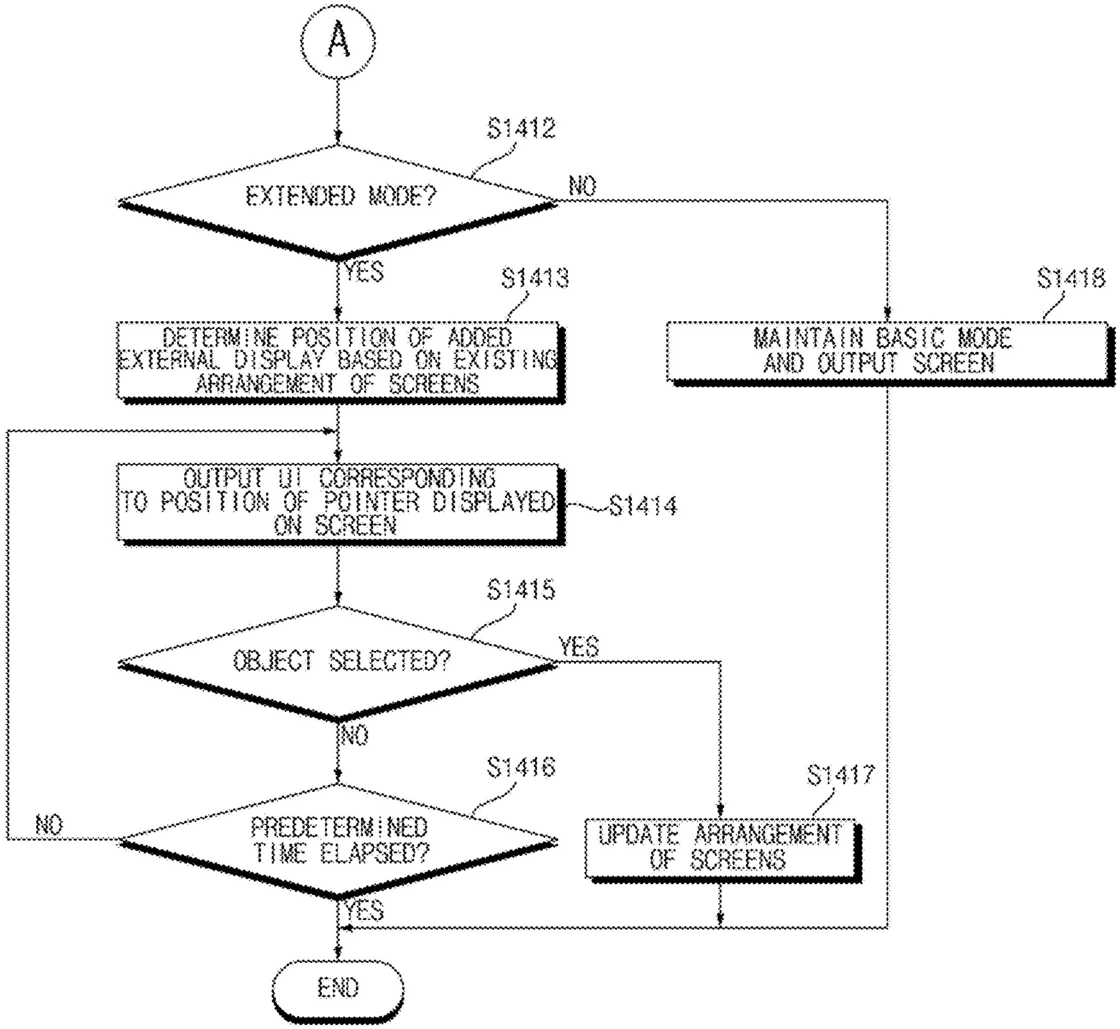

FIGS. 14A and 14B are flowcharts illustrating a method of operating an image display device according to an embodiment of the present disclosure. A detailed description similar or equal to the description of FIG. 4 will be omitted.

Referring to FIG. 14A, in operation S1401, the image display device 100 may be connected with an external display 400.

In operation S1402, the image display device 100 may determine whether the connection with the external display 400 is an additional connection. For example, in a state where the image display device 100 is communicatively connected with at least one external display (400) through the external device interface 130, the image display device 100 may determine whether the external display 400 is additionally connected.

In operation S1403, when the external display 400 is not additionally connected, the image display device 100 may determine whether the connection with the external device 400 is a new connection.

In operation S1404, based on the external display 400 being a newly connected external device, the image display device 100 may set a screen mode for displaying a plurality of screens to a basic mode.

By contrast, in operation S1405, based on the external display 400 not being a newly connected external device, the image display device 100 may set a preset mode for the external display 400 as a screen mode.

In operation S1406, the image device 100 may monitor whether a user input associated with the screen mode is received.

In operation S1407, based on receiving the user input associated with the screen mode, the image device 100 may output a user interface (UI) corresponding to the received user input on the screen output through the display 180.

In operation S1408 and operation S1409, based on selection of an object included in the user interface (UI) through the user input interface 150, the image display device 100 may set the screen mode in response to the selected object.

By contrast, in operation S1410, when an input for selecting an object included in the user interface (UI) through the user input interface 150 is not received, the image display device 100 may terminate the output of the user interface (UI).

In operation S1411, the image display device 100 may determine whether a predetermined time has elapsed after the external display 400 is connected. The image display device 100 may determine whether to output a user interface (UI) based on a user input associated with the screen mode until the predetermined time elapses after the external display 400 is connected.

Meanwhile, referring to FIG. 14B, in operation S1412, when the external display 300 is additionally connected, the image display device 100 may determine whether the currently set screen mode is an extended mode.

In operation S1413, when the currently set screen mode is the extended mode, the image display device 100 may determine a position of the additionally connected external display 400 based on the existing arrangement of screens.

Figure 15:
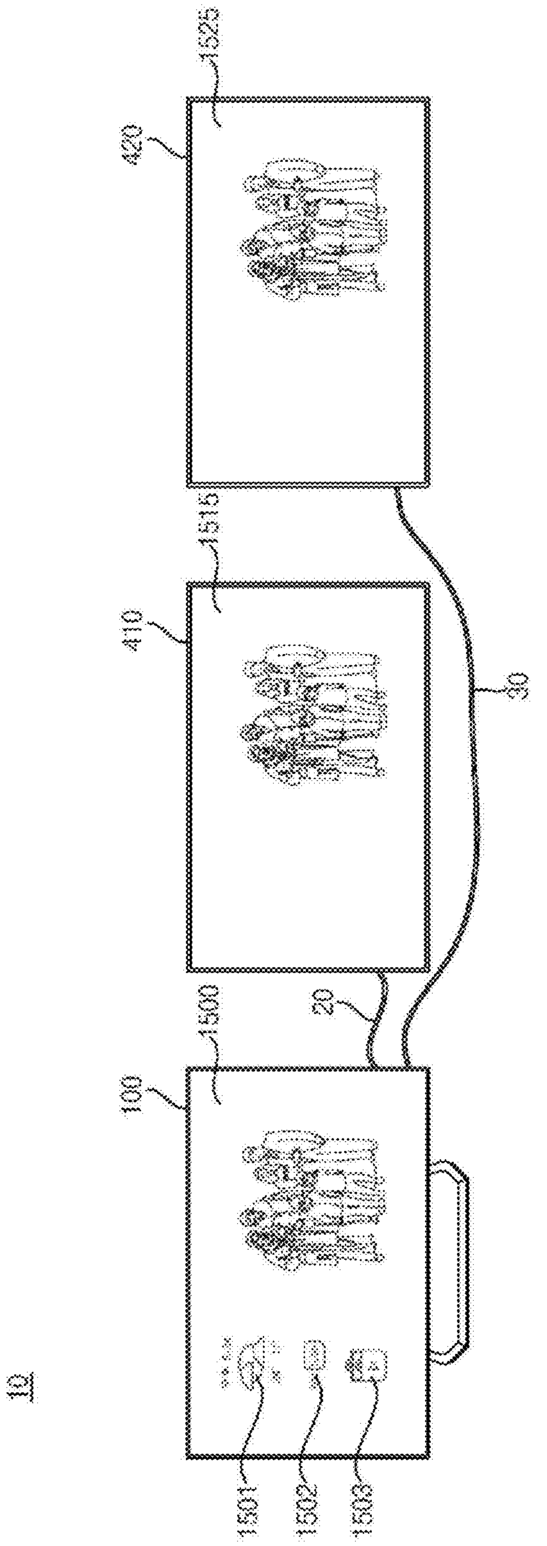
FIGS. 15 to 19 are diagrams for explaining the operation of the image display device.

Referring to FIG. 15, in a state where the image display device 100 and a first external display 410 are communicatively connected via a first cable 20, a second external display 420 may be connected to the image display device 100 via a second cable 30.

Based on the second external display 420 being additionally connected while the screen mode is preset to the extended mode, the image display device 100 may maintain the screen mode in the extended mode. In addition, based on the screen mode being set to the extended mode, the image display device 100 may transmit an image signal different from a main screen 1500 to each of the first display 410 and the second display 420. Based on the respective image signals received from the image display device 100, the first display 410 and the second display 420 may output a first extended screen 1515 and a second extended screen 1525, respectively.

Meanwhile, when the first extended screen 1515 displayed through the first display 410 is preset to be positioned to the right of the main screen 1500, the image display device 100 may determine the arrangement of the plurality of screens so that the second extended screen 1525 output through the second external display 420 is positioned to the right of the first extended screen 1515. That is, based on the arrangement of screens preset in relation to multi-display, the image display device 100 may sequentially arrange extended screens in a specific direction with respect to the main screen.

In operation S1414, based on a position of a pointer 205 displayed on one of the plurality of screens, the image display device 100 may output a user interface (UI) corresponding to the position of the pointer 205.

In operation S1415, the image display device 100 may determine whether an input for selecting an object included in the user interface (UI) through the user input interface 150 is received.

In operation S1416, the image display device 100 may determine whether a predetermined time has elapsed after the external display 400 is additionally connected. The image display device 100 may output the user interface (UI) corresponding to the position of the pointer 205 until the predetermined time elapses after the external display 400 is additionally connected.

Meanwhile, in operation S1417, based on selection of an object included in the user interface (UI) through the user input interface 150, the image display device 100 may update the arrangement of the plurality of screens in response to the selected object.

Figure 16:
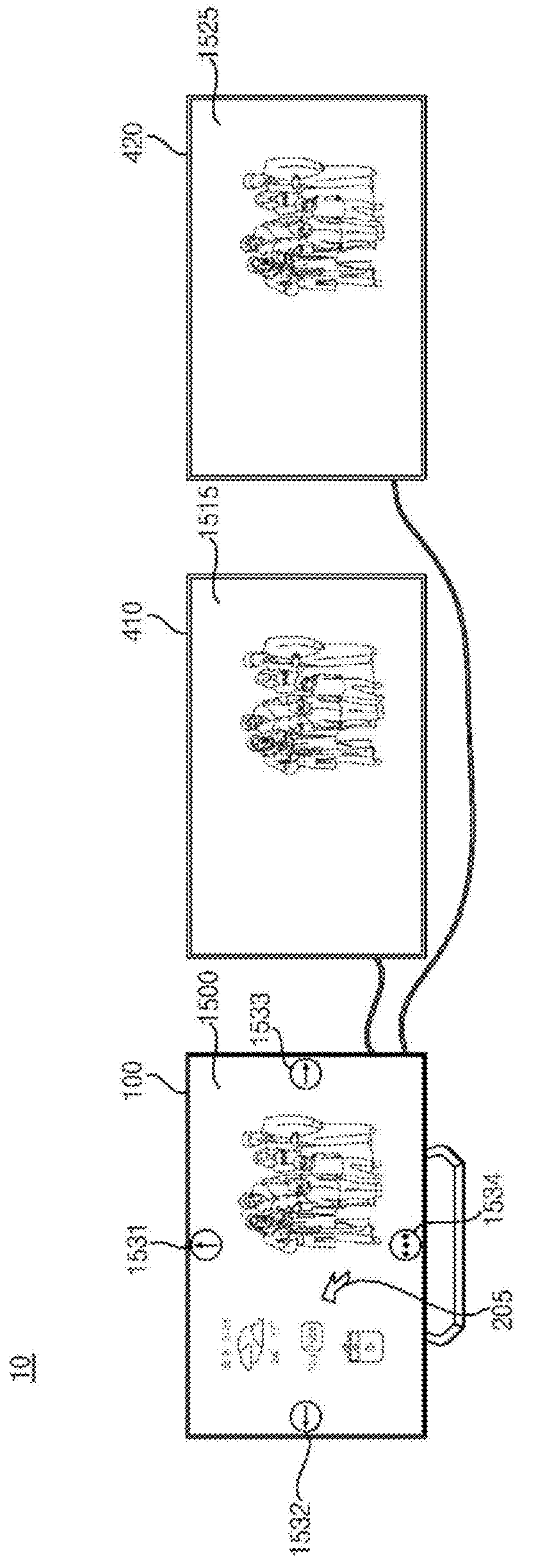

Referring to FIG. 16, based on the pointer 205 corresponding to the remote control device 200 being displayed on the main screen 1500, the image display device 100 may output a user interface (UI) corresponding to the main screen 1500 through the display 180.

The user interface (UI) corresponding to the main screen 1500 may include a first object 1531 indicating the up (upward) direction, a second object 1532 indicating the left direction, a third object 1533 indicating the right direction, and/or a fifth object 1534 for executing a function related to multi-display settings.

Based on receiving an input for selecting one of the first object 1531 to the third object 1533 through the external device interface 150 while the current screen mode is preset to the extended mode, the image display device 100 may determine the arrangement of the plurality of screens so that the second extended screen 1525 is positioned in a direction corresponding to the selected object with respect to the main screen 1500. For example, when an input for selecting the third object 1533 indicating the right direction is received, the image display device 100 may determine the arrangement of the plurality of screens so that the second extended screen 1525 is positioned between the main screen 1500 and the first extended screen 1515. That is, the arrangement of the plurality of screens may be set such that the second extended screen 1525 is positioned to the right of the main screen 1500, and the first extended screen 1515 is positioned to the right of the second extended screen 1525.

Figure 17:
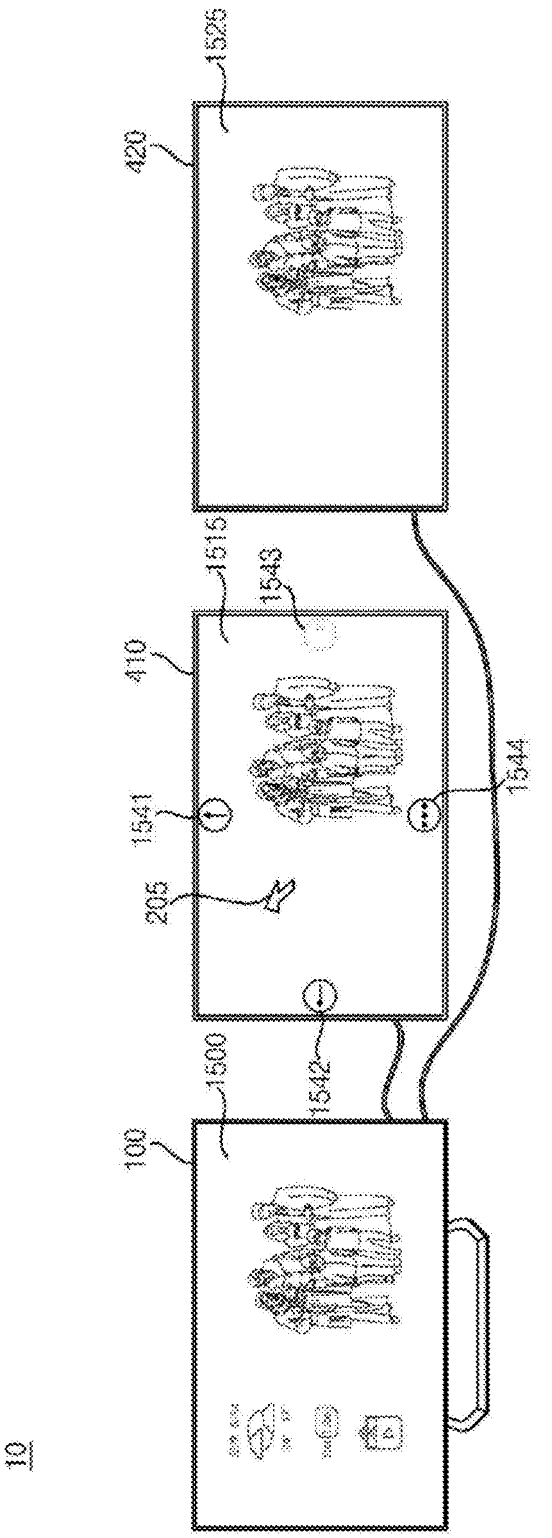

Referring to FIG. 17, based on the pointer 205 corresponding to the remote control device 200 being displayed on the first extended screen 1515 through the first external display 410, the image display device 100 may output a user interface (UI) corresponding to the first extended screen 1515 through the first external display 410. The image display device 100 may transmit image signals corresponding to the first extended screen 1515 and the user interface (UI) to the first external display 410 through the external device interface 150. Based on the image signals received from the image display device 100, the first external display 410 may output the first extended screen 1515 and the user interface (UI).

The user interface corresponding to the first extended screen 1515 may include a first object 1541 indicating the up direction, a second object 1542 indicating the left direction, a third object 1543 indicating the right direction, and/or a fifth object 1544 for executing a function related to multi-display settings. In this case, based on the second extended screen 1525 being preset to be positioned to the right of the first extended screen 1515, the third object 1543 may be output as a non-selectable object.

Based on receiving an input for selecting one of the first object 1541 to the third object 1543 through the external device interface 150 while the current screen mode is preset to the extended mode, the image display device 100 may determine the arrangement of the plurality of screens so that the second extended screen 1525 is positioned in a direction corresponding to the selected object with respect to the first extended screen 1515. For example, when an input for selecting the first object 1541 indicating the left direction is received, the image display device 100 may determine the arrangement of the plurality of screens so that the second extended screen 1525 is positioned between the main screen 1500 and the first extended screen 1515.

Figure 18:
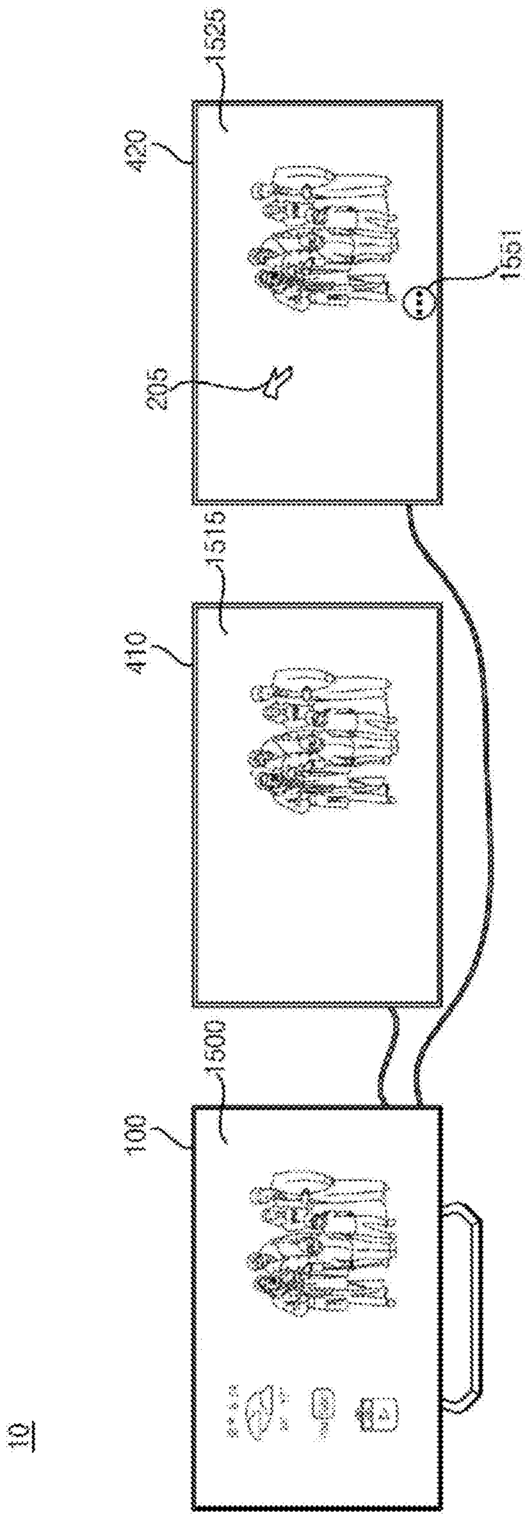

Referring to FIG. 18, based on the pointer 205 corresponding to the remote control device 200 being displayed on the second extended screen 1525 through the second external display 420, the image display device 100 may output a user interface (UI) corresponding to the second extended screen 1525 through the second external display 420. The image display device 100 may transmit image signals corresponding to the second extended screen 1525 and the user interface (UI) to the second external display 420 through the external device interface 150. Based on the image signals received from the image display device 100, the second external display 420 may output the second extended screen 1525 and the user interface (UI). The user interface corresponding to the second extended screen 1525 may include a fifth object 1551 for executing a function related to multi-display settings.

Meanwhile, in operation S1418, when the currently set screen mode is the basic mode, the image display device 100 may maintain the screen mode in the basic mode. In addition, the image display device 100 may output a screen corresponding to the basic mode through the plurality of external displays 400.

Figure 19:
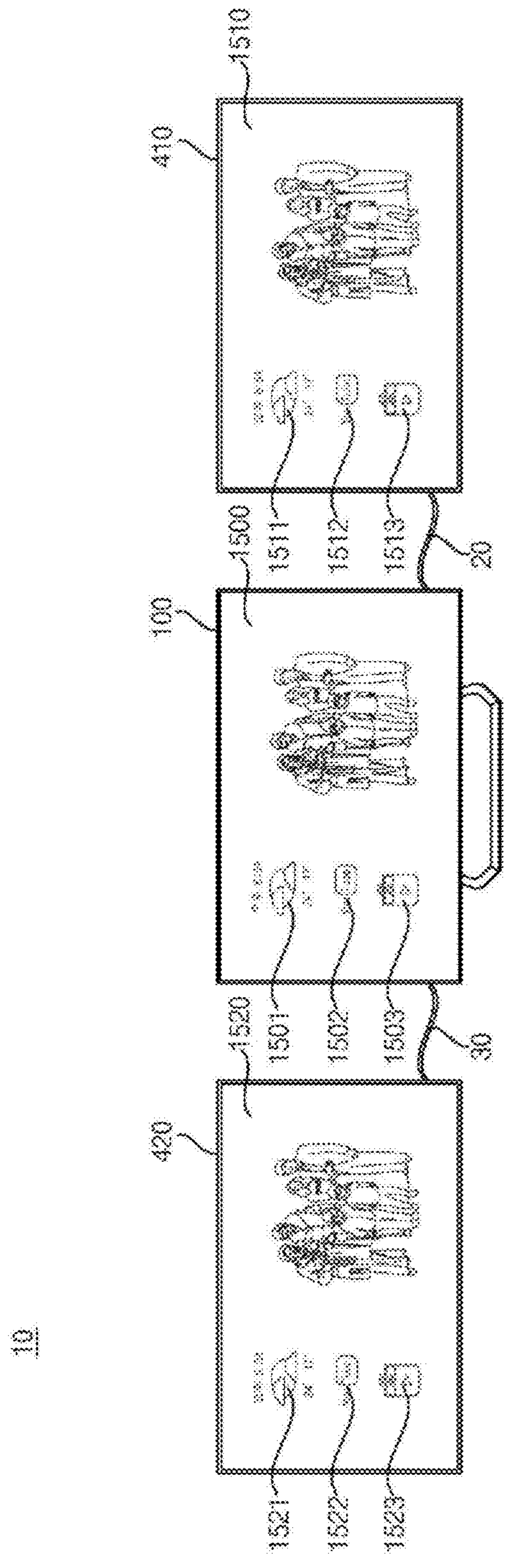

Referring to FIG. 19, based on the screen mode being maintained in the basic mode, the image display device 100 may transmit an image signal corresponding to the main screen 1500 to each of the plurality of external displays 410 and 420. Based on the image signal corresponding to the main screen 1500 received from the image display device 100, the plurality of external displays 410 and 420 may each output a duplicate screen 1510, 1520, which are identical to the main screen 1500.

The main screen 1500 may include an indicator 1501 for providing information such as current time, weather, temperature, and the like, and objects 1502 and 1503 corresponding to applications. Here, the duplicate screen 1510, 1520 may include an indicator 1511, 1521 for providing information such as current time, weather, temperature, and the like, and objects 1512 and 1513, 1522 and 1523 corresponding to applications, which are identical to those included in the main screen 1500.

As described above, according to at least one embodiment of the present disclosure, it is possible to easily update multi-display settings in response to connection with an external display 400.

In addition, according to at least one embodiment of the present disclosure, it is possible to provide a user with a user interface (UI) related to multi-display in an intuitive manner.

Further, according to at least one embodiment of the present disclosure, it is possible to easily determine settings for an additionally connected external display 420 according to settings for an existing connected external display 410.

Referring to FIGS. 1 to 19, according to an aspect of the present disclosure, an image display device 100 may include: a display 180; an external device interface 130 configured to communicate with an external device; a user input interface 150 configured to receive a user input; and a controller 170. The controller 170 may be configured to: based on connection with an external display 400 through the user input interface 130 while a predetermined screen is output through the display 180, monitor whether a predetermined input is received through the user input interface 150; based on receiving the predetermined input while the predetermined screen is displayed, determine at least one of a screen mode for displaying a plurality of screens and arrangement of the plurality of screens; and transmit, through the external device interface 130, an image signal corresponding to the screen mode and the arrangement of the plurality of screens to the external display 400.

According to another aspect of the present disclosure, the controller 170 may be configured to: based on receiving the predetermined input while the predetermined screen is displayed, output a user interface (UI) including at least one object associated with the screen mode on the predetermined screen; and based on selection of the object, determine at least one of the screen mode and the arrangement of the plurality of screens.

According to another aspect of the present disclosure, the image display device 100 may further include a memory 140 configured to store a connection history of the external device. The controller 170 may be configured to: in case that a connection history corresponding to the external display 400 is stored in the memory 140, set, upon connecting with the external display 400, the screen mode according to the connection history corresponding to the external display 400; and in case that the connection history corresponding to the external display 400 is not stored in the memory 140, set a preset mode as the screen mode upon connecting with the external display 400.

According to another aspect of the present disclosure, the screen mode may include: a basic mode to output a same screen through the display 180 and the external display 400; and an extended mode to output different screens through the display 180 and the external display 400 according to the arrangement of the plurality of screens.

According to another aspect of the present disclosure, in case that a pointer 205 displayed on the predetermined screen is located in a predetermined area, the controller 170 may be configured to output an object corresponding to a position of the pointer 205 on the predetermined screen.

According to another aspect of the present disclosure, the controller 170 may be configured to: based on the pointer 205 being located in an area corresponding to a specific direction among a plurality of directions, output a specific object indicating the specific direction on the predetermined screen; based on selection of the specific object, set the screen mode to the extended mode; and determine the arrangement of the plurality of screens so that a second screen corresponding to the external display 400 is positioned in the specific direction with respect to a first screen corresponding to the display 180.

According to another aspect of the present disclosure, based on the arrangement of the plurality of screens not being preset that the second screen is positioned in the specific direction with respect to the first screen, the specific object may be displayed in a first state, which is selectable, and based on the arrangement of the plurality of screens being preset that the second screen is positioned in the specific direction with respect to the first screen, the specific object may be displayed in a second state, which is not selectable.

According to another aspect of the present disclosure, the controller 170 may be configured to: based on the pointer 205 being located in an area corresponding to a setting of the screen mode, output an object corresponding to the basic mode; and based on selection of the object corresponding to the basic mode, set the screen mode to the basic mode.

According to another aspect of the present disclosure, when the screen mode is preset to the extended mode, the object corresponding to the basic mode may be displayed in a first state, which is selectable, and when the screen mode is preset to the basic mode, the object corresponding to the basic mode may be displayed in a second state, which is not selectable.

According to another aspect of the present disclosure, the controller 170 may be configured to: maintain the screen mode based on a second external display 400 being additionally connected while being connected with a first external display 400; and based on the screen mode being the extended mode, determine a position of a third screen corresponding to the second external display 400 according to arrangement of a first screen corresponding to the display 180 and a second screen corresponding to the first external display 400.

According to another aspect of the present disclosure, in case that the second screen is preset to be positioned in a specific direction with respect to the first screen, the controller 170 may be configured to determine the arrangement of the plurality of screens so that the third screen is positioned in the specific direction with respect to the second screen.

According to another aspect of the present disclosure, while the screen mode is the extended mode, the controller

170 may be configured to: based on a pointer 205 corresponding to the user input being located on the first screen, output a plurality of objects respectively indicating a plurality of directions on the first screen; and based on the pointer 205 being located on the second screen, output the plurality of objects on the second screen.

According to another aspect of the present disclosure, based on an input for selecting one of the plurality of objects, the controller 170 may be configured to update the arrangement of the plurality of screens according to a direction corresponding to the selected object.

According to another aspect of the present disclosure, the controller 170 may be configured to: based on receiving a specific input corresponding to a specific direction a predetermined number of times in a row through the user input interface 150, set the screen mode to the extended mode; and determine the arrangement of the plurality of screens so that a second display corresponding to the external display 400 is positioned in the specific direction with respect to a first screen corresponding to the display 180.

According to another aspect of the present disclosure, the controller 170 may be configured to: based on receiving a specific input corresponding to a specific direction a predetermined number of times in a row while the predetermined screen is displayed, output a user interface (UI) indicating the specific direction on the predetermined screen; based on selection of the specific object, set the screen mode to the extended mode; and determine the arrangement of the plurality of screens so that a second screen corresponding to the external display 400 is positioned in the specific direction with respect to a first screen corresponding to the display 180.

The above description should not be construed as restrictive in all aspects but considered as illustrative. The scope of the disclosure should be determined by reasonable interpretation of the appended claims and all changes that come within the equivalent scope of the disclosure are included in the scope of the disclosure.

Meanwhile, the method of operating the image display device of the present disclosure can be implemented as processor-readable code in a recording medium readable by a processor provided in the image display device. The processor-readable recording medium may be any type of recording device capable of storing data readable by a processor. Examples of the processor-readable recording medium may include a ROM, a RAM, a CD-ROM, a magnetic tape, a floppy disc, and an optical data storage device. Also, the processor-readable recording medium may be implemented as a carrier wave (e.g., data transmission over the Internet). The processor-readable recording medium may be distributed to a computer system connected via a network so that the processor-readable codes may be saved and executed in a distributed manner.

Although the preferred embodiments of the present disclosure have been illustrated and described, those skilled in the art will appreciate that the present disclosure should not be limited to the above specific embodiments and various modifications thereof are possible without departing from the scope and spirit of the disclosure as disclosed in the accompanying claims, and these modifications should not be understood independently of the technical idea of the present disclosure.

The invention claimed is:

1. An image display device comprising:
- a display;
- an external device interface configured to communicate with an external device;
- a user input interface configured to receive a user input; and
- a controller,
- wherein the controller is configured to:
- based on connection with an external display through the external device interface while a predetermined screen is output through the display, monitor whether a predetermined input is received through the user input interface;
- based on receiving the predetermined input while the predetermined screen is displayed, determine at least one of a screen mode for displaying a plurality of screens and arrangement of the plurality of screens; and
- transmit, through the external device interface, an image signal corresponding to the screen mode and the arrangement of the plurality of screens to the external display,
- wherein the controller is further configured to:
- based on receiving a first input corresponding to a first direction a predetermined number of times in a row through the user input interface, set the screen mode to an extended mode in which different screens are respectively output through the display and the at least one external display according to the arrangement of the plurality of screens; and
- determine the arrangement of the plurality of screens so that a second screen corresponding to a first external display is positioned in the first direction with respect to a first screen corresponding to the display.

2. The image display device of claim 1, wherein the controller is configured to:
- based on receiving a second input while the predetermined screen is displayed, output a user interface (UI) including at least one object associated with the screen mode on the predetermined screen; and
- based on selection of one of the at least one object, determine at least one of the screen mode and the arrangement of the plurality of screens.

3. The image display device of claim 1, further comprising a memory configured to store a connection history of the external device,
- wherein the controller is configured to:
- in case that a connection history corresponding to the external display is stored in the memory, set, upon connecting with the external display, the screen mode according to the connection history corresponding to the external display; and
- in case that the connection history corresponding to the external display is not stored in the memory, set a preset mode as the screen mode upon connecting with the external display.

4. The image display device of claim 1, wherein the screen mode further includes
- a basic mode to output a same screen through the display and the external display.

5. The image display device of claim 4, wherein, in case that a pointer displayed on the predetermined screen is located in a predetermined area, the controller is configured to output an object corresponding to a position of the pointer on the predetermined screen.

6. The image display device of claim 5, wherein the controller is configured to:
- based on the pointer being located in an area corresponding to a second direction among a plurality of directions, output a specific object indicating the second direction on the predetermined screen;

based on selection of the specific object, set the screen mode to the extended mode; and determine the arrangement of the plurality of screens so that the second screen corresponding to the external display is positioned in the second direction with respect to the first screen corresponding to the display.

7. The image display device of claim 6, wherein:

based on the arrangement of the plurality of screens not being preset that the second screen is positioned in the second direction with respect to the first screen, the specific object is displayed in a first state, which is selectable; and based on the arrangement of the plurality of screens being preset that the second screen is positioned in the second direction with respect to the first screen, the specific object is displayed in a second state, which is not selectable.

8. The image display device of claim 5, wherein the controller is configured to:

based on the pointer being located in an area corresponding to a setting of the screen mode, output an object corresponding to the basic mode; and based on selection of the object corresponding to the basic mode, set the screen mode to the basic mode.

9. The image display device of claim 8, wherein:

when the screen mode is preset to the extended mode, the object corresponding to the basic mode is displayed in a first state, which is selectable; and when the screen mode is preset to the basic mode, the object corresponding to the basic mode is displayed in a second state, which is not selectable.

10. The image display device of claim 1, wherein the controller is configured to:

maintain the screen mode based on a second external display being additionally connected while being connected with the first external display; and based on the screen mode being the extended mode, determine a position of a third screen corresponding to the second external display according to arrangement of the first screen corresponding to the display and the second screen corresponding to the first external display.

11. The image display device of claim 10, wherein, in case that the second screen is preset to be positioned in the first direction with respect to the first screen, the controller is configured to determine the arrangement of the plurality of screens so that the third screen is positioned in the first direction with respect to the second screen.

12. The image display device of claim 10, wherein, while the screen mode is the extended mode, the controller is configured to:

based on a pointer corresponding to the user input being located on the first screen, output a plurality of objects respectively indicating a plurality of directions on the first screen; and based on the pointer being located on the second screen, output the plurality of objects on the second screen.

13. The image display device of claim 12, wherein, based on an input for selecting one of the plurality of objects, the controller is configured to update the arrangement of the plurality of screens according to a direction corresponding to the selected object.

14. The image display device of claim 1, wherein the controller is configured to:

in response to receiving the first input, output a user interface (UI) including a specific object indicating the first direction on the predetermined screen; and based on selection of the specific object, set the screen mode to the extended mode and determine the arrangement of the plurality of screens so that the second screen is positioned in the first direction with respect to the first screen.

* * * * *